(12) United States Patent
Umbehocker

(10) Patent No.: US 9,391,952 B2
(45) Date of Patent: *Jul. 12, 2016

(54) METHODS AND SYSTEMS FOR DYNAMICALLY SWITCHING BETWEEN COMMUNICATIONS PROTOCOLS

(71) Applicant: Citrix Systems, Inc., Fort Lauderdale, FL (US)

(72) Inventor: Steven Michael Umbehocker, Mercer Island, WA (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,125

(22) Filed: Jun. 12, 2014

(65) Prior Publication Data
US 2014/0297782 A1     Oct. 2, 2014

Related U.S. Application Data

(63) Continuation of application No. 12/556,619, filed on Sep. 10, 2009, now Pat. No. 8,775,544.

(60) Provisional application No. 61/149,781, filed on Feb. 4, 2009, provisional application No. 61/149,812, filed on Feb. 4, 2009.

(51) Int. Cl.
*H04L 29/06*     (2006.01)
*H04L 29/12*     (2006.01)
(Continued)

(52) U.S. Cl.
CPC .......... *H04L 61/6045* (2013.01); *G06F 3/0604* (2013.01); *G06F 3/067* (2013.01);
(Continued)

(58) Field of Classification Search
CPC ........ H04L 69/08; H04L 69/18; H04L 67/148
See application file for complete search history.

(56) References Cited

U.S. PATENT DOCUMENTS 5,987,506 A    11/1999   Carter et al.
6,041,381 A     3/2000   Hoese
(Continued)

FOREIGN PATENT DOCUMENTS

EP           2 017 711       1/2009
WO    WO-2006/045847 A1   5/2006
WO    WO-2008/126163 A1   3/2007

OTHER PUBLICATIONS

"Best Practices for Citrix XenDesktop with Provisioning Server", 2008, Citrix Systems, Inc., pp. 1-19.
(Continued)

*Primary Examiner* — Jeong S Park
(74) *Attorney, Agent, or Firm* — Foley & Lardner LLP; John D. Lanza; James De Vellis

(57) ABSTRACT

A method for dynamically switching between communications protocols used in communicating with each of a plurality of physical computing devices includes configuring, by a storage delivery management service, a storage system in a storage area network, to communicate, according to a first communications protocol with a first physical computing device executing a virtual machine, the storage system providing, to the virtual machine, access to a virtual storage resource. The storage delivery management service receives a request to migrate the virtual machine from the first physical computing device to a second physical computing device. The storage delivery management service configures the storage system to communicate with the second physical computing device according to a second communications protocol. The storage delivery management service transmits, to the second physical computing device, an identification of the storage system providing access to the virtual storage resource for the virtual machine.

20 Claims, 16 Drawing Sheets

(51) Int. Cl.
*G06F 3/06* (2006.01)
*G06F 9/50* (2006.01)
*G06F 17/30* (2006.01)
*H04L 29/08* (2006.01)
*G06F 9/455* (2006.01)

(52) U.S. Cl.
CPC .......... *G06F 3/0622* (2013.01); *G06F 3/0631* (2013.01); *G06F 3/0661* (2013.01); *G06F 3/0665* (2013.01); *G06F 9/45558* (2013.01); *G06F 9/5011* (2013.01); *G06F 9/5016* (2013.01); *G06F 9/5072* (2013.01); *H04L 67/1097* (2013.01); *H04L 69/18* (2013.01); *G06F 17/30507* (2013.01); *G06F 2009/45579* (2013.01); *H04L 67/148* (2013.01); *H04L 69/08* (2013.01)

(56) References Cited

U.S. PATENT DOCUMENTS

| | | | |
|---|---|---|---|
| 6,567,818 B1 | 5/2003 | Frey et al. | |
| 7,194,519 B1 | 3/2007 | Muhlestein et al. | |
| 7,263,593 B2 | 8/2007 | Honda et al. | |
| 7,315,903 B1 | 1/2008 | Bowden | |
| 7,506,037 B1 | 3/2009 | Ciano et al. | |
| 8,275,886 B1 | 9/2012 | Galan | |
| 8,775,544 B2* | 7/2014 | Umbehocker | G06F 3/0604 709/212 |
| 8,918,488 B2* | 12/2014 | Umbehocker | G06F 3/0604 709/201 |
| 2002/0010812 A1 | 1/2002 | Hoese et al. | |
| 2002/0103889 A1 | 8/2002 | Markson et al. | |
| 2003/0126327 A1 | 7/2003 | Pesola et al. | |
| 2003/0191810 A1 | 10/2003 | Muhlestein et al. | |
| 2004/0003089 A1 | 1/2004 | Chiu | |
| 2004/0221298 A1 | 11/2004 | Cedola | |
| 2005/0038849 A1 | 2/2005 | Kaluskar et al. | |
| 2005/0198336 A1* | 9/2005 | Eytchison | H04L 69/32 709/230 |
| 2006/0026383 A1 | 2/2006 | Dinechin et al. | |
| 2006/0041595 A1* | 2/2006 | Taguchi et al. | 707/200 |
| 2006/0080416 A1 | 4/2006 | Gandhi | |
| 2006/0085699 A1* | 4/2006 | Hathorn | G06F 11/221 714/56 |
| 2006/0143322 A1 | 6/2006 | Hoese et al. | |
| 2007/0083482 A1 | 4/2007 | Rathi et al. | |
| 2007/0208836 A1 | 9/2007 | Madnani et al. | |
| 2007/0260768 A1 | 11/2007 | Bender et al. | |
| 2007/0283119 A1 | 12/2007 | Sarkar et al. | |
| 2008/0005165 A1 | 1/2008 | Martin et al. | |
| 2008/0027054 A1 | 1/2008 | Boyle et al. | |
| 2008/0126163 A1 | 5/2008 | Hogan et al. | |
| 2008/0154840 A1 | 6/2008 | Rathi et al. | |
| 2008/0154993 A1 | 6/2008 | Rathi et al. | |
| 2008/0155169 A1 | 6/2008 | Hiltgen et al. | |
| 2008/0270564 A1* | 10/2008 | Rangegowda et al. | 709/212 |
| 2008/0271057 A1 | 10/2008 | Bates et al. | |
| 2009/0216999 A1 | 8/2009 | Gebhart et al. | |
| 2009/0228535 A1 | 9/2009 | Rathi et al. | |
| 2009/0228649 A1 | 9/2009 | Porel et al. | |
| 2009/0249332 A1* | 10/2009 | Hoehle et al. | 718/1 |
| 2009/0276774 A1* | 11/2009 | Kinoshita | G06F 21/6218 718/1 |
| 2009/0300023 A1 | 12/2009 | Vaghani | |
| 2009/0307761 A1 | 12/2009 | Iyoda | |
| 2010/0050173 A1 | 2/2010 | Hensbergen | |
| 2010/0131944 A1 | 5/2010 | Iorio et al. | |
| 2010/0198972 A1* | 8/2010 | Umbehocker | 709/226 |
| 2010/0260202 A1* | 10/2010 | Fujinaga | 370/466 |
| 2010/0306773 A1 | 12/2010 | Lee et al. | |
| 2011/0119748 A1 | 5/2011 | Edwards et al. | |
| 2014/0143318 A1 | 5/2014 | McWhirter et al. | |

OTHER PUBLICATIONS

"Storage Management Initiative Technical Tutorial", 2006, Storage Networking Industry Association and WBEM Solutions.
Chinese Office Action on 201080005003.4 dated Mar. 18, 2014.
Chinese Office Action on 201080005003.4 dated Aug. 12, 2013.
Chinese Office Action on 201080005006.8 dated Sep. 30, 2013.
European Examination Report on 10702380.6 dated Mar. 11, 2013.
International Report on Patentability on PCT/US2010/021754 dated Aug. 18, 2011.
International Report on Patentability on PCT/US2010/022032 dated Aug. 18, 2011.
International Search Report for PCT/US2010/021754 dated Mar. 31, 2010.
International Search Report for PCT/US2010/022032 dated Mar. 31, 2010.
Notice of Allowance on U.S. Appl. No. 12/556,619 dated Mar. 5, 2014.
Office Action on U.S. Appl. No. 12/556,611 dated Nov. 13, 2012.
Office Action on U.S. Appl. No. 12/556,611 dated Nov. 27, 2013.
Office Action on U.S. Appl. No. 12/556,611 dated Dec. 2, 2011.
Office Action on U.S. Appl. No. 12/556,611 dated Mar. 14, 2012.
Office Action on U.S. Appl. No. 12/556,611 dated May 28, 2013.
Office Action on U.S. Appl. No. 12/556,619 dated Oct. 11, 2012.
Office Action on U.S. Appl. No. 12/556,619 dated Nov. 14, 2013.
Office Action on U.S. Appl. No. 12/556,619 dated Mar. 25, 2013.
Office Action on U.S. Appl. No. 12/556,619 dated Apr. 30, 2012.
Office Action on U.S. Appl. No. 12/556,619 dated Jul. 15, 2013.
Office Action on U.S. Appl. No. 12/556,624 dated Jan. 8, 2013.
Office Action on U.S. Appl. No. 12/556,624 dated Dec. 9, 2013.
Office Action on U.S. Appl. No. 12/556,624 dated Jun. 19, 2013.
Office Action on U.S. Appl. No. 12/556,624 dated Jun. 20, 2012.
Smith et. ai, "Virtual Utility—University of Auckland", 2007, University of Auckland, pp. 3-12.
T. Weimer, "Fibre Channel Fundamentals", Feb. 25, 2003, Fibre Channel solutions. pp. 2 and 8.
Written Opinion of the International Search Authority for PCT/US2010/021754 dated Apr. 8, 2011.
Written Opinion of the International Search Authority for PCT/US2010/022032 dated Apr. 8, 2011.
Chinese Office Action on 201080005003.4 dated Jun. 23, 2014.
Chinese Office Action on 201080005006.8 dated Jun. 5, 2014.
Notice of Allowance on U.S. Appl. No. 12/556,624 dated Aug. 22, 2014.
US Office Action in U.S. Appl. No. 12/556,611 DTD Oct. 3, 2014.
US Office Action in U.S. Appl. No. 12/556,611 DTD Apr. 30, 2015.

* cited by examiner

```
<ScsiDeviceIDProcessor>
        <InquiryMatch>
                <Vendor>ACME</Vendor>
                <Product>A300</Product>
        </InquiryMatch>
        <VendorID value="ACME">
        </VendorID>
        <ProductID value="ASERIES">
        </ProductID>
        <EnclosureID page="0" offset="154" length="16">
        </EnclosureID>
        <DeviceID page="131" offset="8" length="16" fmt="hex">
        </DeviceID>
</ScsiDeviceIDProcessor>
```

METHODS AND SYSTEMS FOR DYNAMICALLY SWITCHING BETWEEN COMMUNICATIONS PROTOCOLS

RELATED APPLICATIONS

The present application is a continuation of U.S. patent application Ser. No. 12/556,619, titled "Methods and Systems for Dynamically Switching Between Communications Protocols," filed on Sep. 10, 2009, which claims priority to U.S. Provisional Patent Application Ser. No. 61/149,812, filed on Feb. 4, 2009, entitled "Methods and Systems for Analyzing Data Retrieved from a Storage System in a Cloud Computing Environment", and to U.S. Provisional Patent Application Ser. No. 61/149,781, filed on Feb. 4, 2009, entitled "Methods and Systems for Automated Provisioning of Virtual Resources in a Cloud Computing Environment", each of which is incorporated herein in its entirety by reference.

FIELD OF THE DISCLOSURE

This disclosure generally relates to systems and methods for communicating with a plurality of computing devices. In particular, this disclosure relates to methods and systems for dynamically switching between communications protocols.

BACKGROUND OF THE DISCLOSURE

In conventional computing environments implementing a hypervisor to execute a virtual machine on a host computing device, the hypervisor typically provides the virtual machine with access to hardware resources provided by the host computing device. The hypervisor may allocate physical resources from a pool of physical computing devices, which may include heterogeneous processors providing different levels or types of functionality. In some environments, a hypervisor may need to migrate a virtual machine from one physical computing device to a second physical computing device; for example, when the first physical computing device requires maintenance or no longer has the capacity to provide the virtual machine with the allocated hardware resources. In the event that the two physical computing devices provide different functionality—for example, the first physical computing device supports a first communications protocol for communicating with other machines on a network while the second physical computing device supports a second communications protocol—the migration of the virtual machine from the first physical computing device to the second may fail. For example, the virtual machine may require access to resources provided via communication with a third physical computing device according to a first protocol and a migration of the virtual machine to a physical computing device supporting a different communications protocol may result in unanticipated execution errors or undesired termination of the virtual machine.

Conventional solutions to this problem typically involve providing homogeneous functionality in the pool of physical computing devices, for example, by excluding from the pool a physical computing device that provides access to a physical resource or that supports a communication protocol that is not universally supported by each of the physical computing devices in the pool, or by disabling access to the physical resource. However, this approach typically limits an administrator's ability to provide a diverse range of functionality for users. Furthermore, as physical resources age and require replacement, administrators may not be able to find replacement devices that provide identical functionality.

BRIEF SUMMARY OF THE DISCLOSURE

In one aspect, a method for dynamically switching between communications protocols used in communicating with each of a plurality of physical computing devices includes configuring, by a storage delivery management service, a storage system in a storage area network, to communicate, according to a first communications protocol with a first physical computing device executing a virtual machine, the storage system providing, to the virtual machine, access to a virtual storage resource. The method includes receiving, by the storage delivery management service, a request to migrate the virtual machine from the first physical computing device to a second physical computing device. The method includes configuring, by the storage delivery management service, the storage system to communicate with the second physical computing device according to a second communications protocol. The method includes transmitting, by the storage delivery management service, to the second physical computing device, an identification of the storage system providing access to the virtual storage resource for the virtual machine.

In one embodiment, the method includes requesting, by the storage delivery management service, from the second physical computing device, an identification of at least one communications protocol supported by the second physical computing device. In another embodiment, the method includes requesting, by the storage delivery management service, from the storage system, an identification of at least one communications protocol supported by the storage system. In still another embodiment, the method includes migrating, by the storage delivery management service, to the second physical computing device, the virtual machine during execution of the virtual machine.

In another aspect, a system for dynamically switching between communications protocols used in communicating with each of a plurality of physical computing devices includes a host computing device communication component and a storage system communication component. The host computing device communication component, executed by a storage delivery management service, receives, from a first physical computing device executing a virtual machine, a request for migration of the virtual machine to a second physical computing device. The storage system communication component executed by the storage delivery management service i) configures a storage system in a storage area network to communicate, according to a first communications protocol with the first physical computing device, the storage system providing, to the virtual machine, access to a virtual storage resource, ii) receives a notification, from the host computing device communication component, of a migration of the virtual machine to the second physical computing device, and iii) configures the storage system to communicate according to a second communications protocol with the second physical computing device. In one embodiment, the system includes a migration management component, in communication with the host computing device communication component, migrating the virtual machine from the first physical computing device to the second physical computing device.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 5C is a block diagram depicting one embodiment of a portion of an interface translation file;

DETAILED DESCRIPTION

Figure 1A:
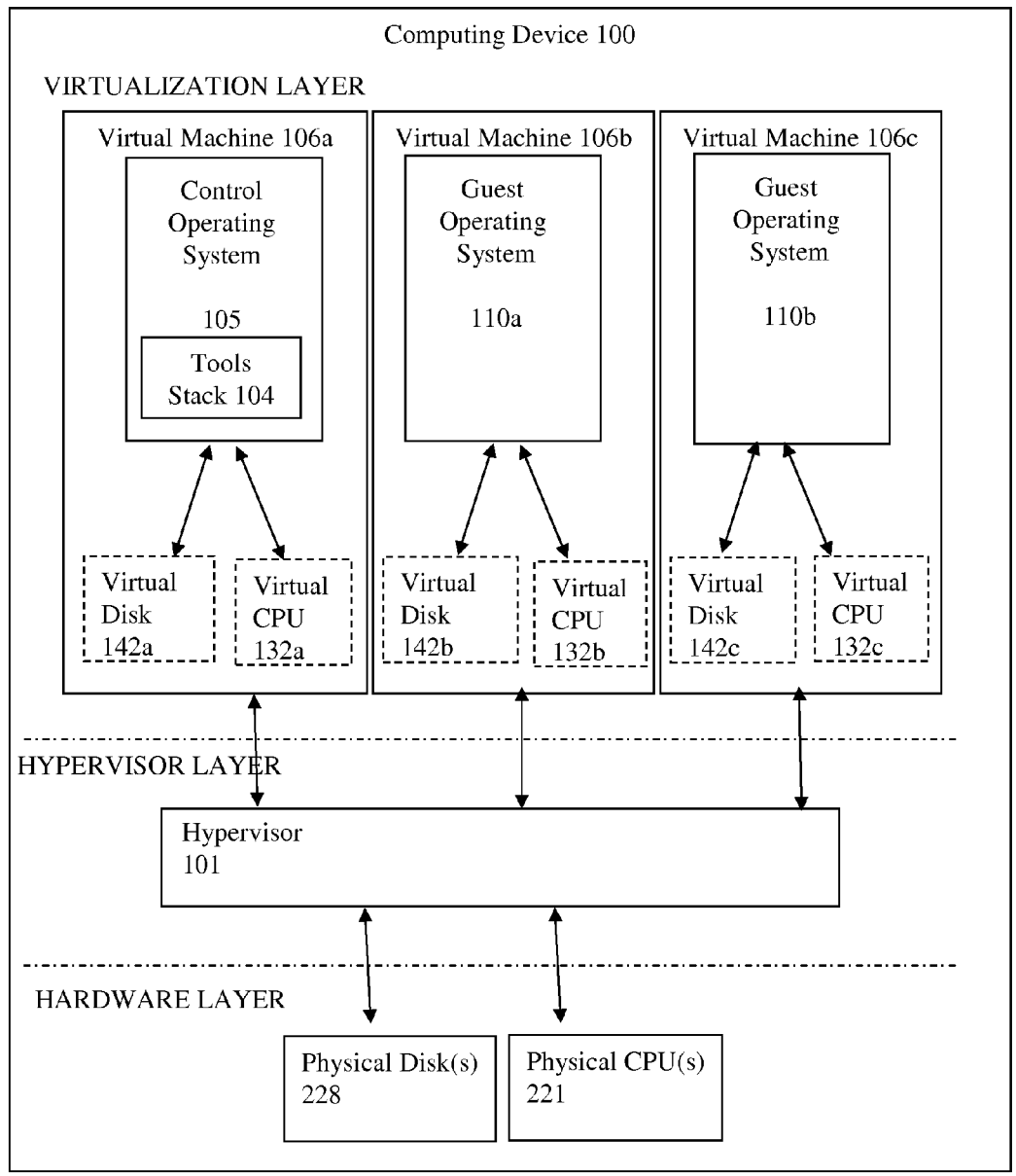
FIG. 1A is a block diagram depicting an embodiment of a computing environment comprising a hypervisor layer, a virtualization layer, and a hardware layer.

Referring now to FIG. 1A, a block diagram depicts one embodiment of a virtualization environment. In brief overview, a computing device 100 includes a hypervisor layer, a virtualization layer, and a hardware layer. The hypervisor layer includes a hypervisor 101 (also referred to as a virtualization manager) that allocates and manages access to a number of physical resources in the hardware layer (e.g., the processor(s) 221, and disk(s) 228) by at least one virtual machine executing in the virtualization layer. The virtualization layer includes at least one operating system 110 and a plurality of virtual resources allocated to the at least one operating system 110. Virtual resources may include, without limitation, a plurality of virtual processors 132a, 132b, 132c (generally 132), and virtual disks 142a, 142b, 142c (generally 142), as well as virtual resources such as virtual memory and virtual network interfaces. The plurality of virtual resources and the operating system 110 may be referred to as a virtual machine 106. A virtual machine 106 may include a control operating system 105 in communication with the hypervisor 101 and used to execute applications for managing and configuring other virtual machines on the computing device 100.

Referring now to FIG. 1A, and in greater detail, a hypervisor 101 may provide virtual resources to an operating system in any manner that simulates the operating system having access to a physical device. A hypervisor 101 may provide virtual resources to any number of guest operating systems 110a, 110b (generally 110). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 101 executes within an operating system executing on a computing device. In one of these embodiments, a computing device executing an operating system and a hypervisor 101 may be said to have a host operating system (the operating system executing on the computing device), and a guest operating system (an operating system executing within a computing resource partition provided by the hypervisor 101). In other embodiments, a hypervisor 101 interacts directly with hardware on a computing device, instead of executing on a host operating system. In one of these embodiments, the hypervisor 101 may be said to be executing on "bare metal," referring to the hardware comprising the computing device.

In some embodiments, a hypervisor 101 may create a virtual machine 106a-c (generally 106) in which an operating system 110 executes. In one of these embodiments, for example, the hypervisor 101 loads a virtual machine image to create a virtual machine 106. In another of these embodiments, the hypervisor 101 executes an operating system 110 within the virtual machine 106. In still another of these embodiments, the virtual machine 106 executes an operating system 110.

In some embodiments, the hypervisor 101 controls processor scheduling and memory partitioning for a virtual machine 106 executing on the computing device 100. In one of these embodiments, the hypervisor 101 controls the execution of at least one virtual machine 106. In another of these embodiments, the hypervisor 101 presents at least one virtual machine 106 with an abstraction of at least one hardware resource provided by the computing device 100. In other embodiments, the hypervisor 101 controls whether and how physical processor capabilities are presented to the virtual machine 106.

A control operating system 105 may execute at least one application for managing and configuring the guest operating systems. In one embodiment, the control operating system 105 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 101 executes the control operating system 105 within a virtual machine 106 created by the hypervisor 101. In still another embodiment, the control operating system 105 executes in a virtual machine 106 that is authorized to directly access physical resources on the computing device 100. In some embodiments, a control operating system 105a on a computing device 100a may exchange data with a control operating system 105b on a computing device 100b, via communications between a hypervisor 101a and a hypervisor 101b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In one embodiment, the control operating system 105 executes in a virtual machine 106 that is authorized to interact with at least one guest operating system 110. In another embodiment, a guest operating system 110 communicates with the control operating system 105 via the hypervisor 101 in order to request access to a disk or a network. In still another embodiment, the guest operating system 110 and the control operating system 105 may communicate via a communication channel established by the hypervisor 101, such as, for example, via a plurality of shared memory pages made available by the hypervisor 101.

In some embodiments, the control operating system 105 includes a network back-end driver for communicating directly with networking hardware provided by the computing device 100. In one of these embodiments, the network back-end driver processes at least one virtual machine request from at least one guest operating system 110. In other embodiments, the control operating system 105 includes a block back-end driver for communicating with a storage element on the computing device 100. In one of these embodiments, the block back-end driver reads and writes data from the storage element based upon at least one request received from a guest operating system 110.

In one embodiment, the control operating system 105 includes a tools stack 104. In another embodiment, a tools stack 104 provides functionality for interacting with the hypervisor 101, communicating with other control operating systems 105 (for example, on a second computing device 100b), or managing virtual machines 106b, 106c on the computing device 100. In another embodiment, the tools stack 104 includes customized applications for providing improved management functionality to an administrator of a virtual machine farm. In some embodiments, at least one of the tools stack 104 and the control operating system 105 include a management API that provides an interface for remotely configuring and controlling virtual machines 106 running on a computing device 100. In other embodiments, the control operating system 105 communicates with the hypervisor 101 through the tools stack 104.

In one embodiment, the hypervisor 101 executes a guest operating system 110 within a virtual machine 106 created by the hypervisor 101. In another embodiment, the guest operating system 110 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In one embodiment, the guest operating system 110, in conjunction with the virtual machine on which it executes, forms a fully-virtualized virtual machine that is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 101; in such an embodiment, the driver is typically aware that it executes within a virtualized environment.

Figure 1B:
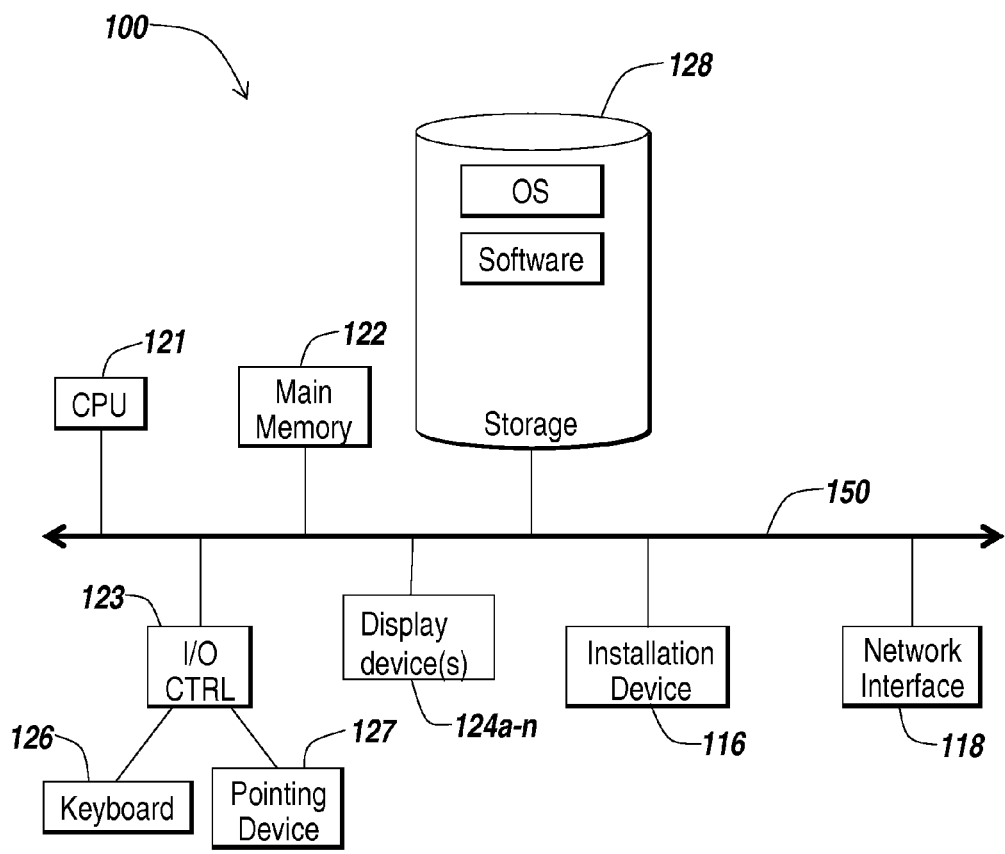
FIGS. 1B-1E are block diagrams depicting embodiments of computing devices useful in connection with the methods and systems described herein.
Figure 1C:
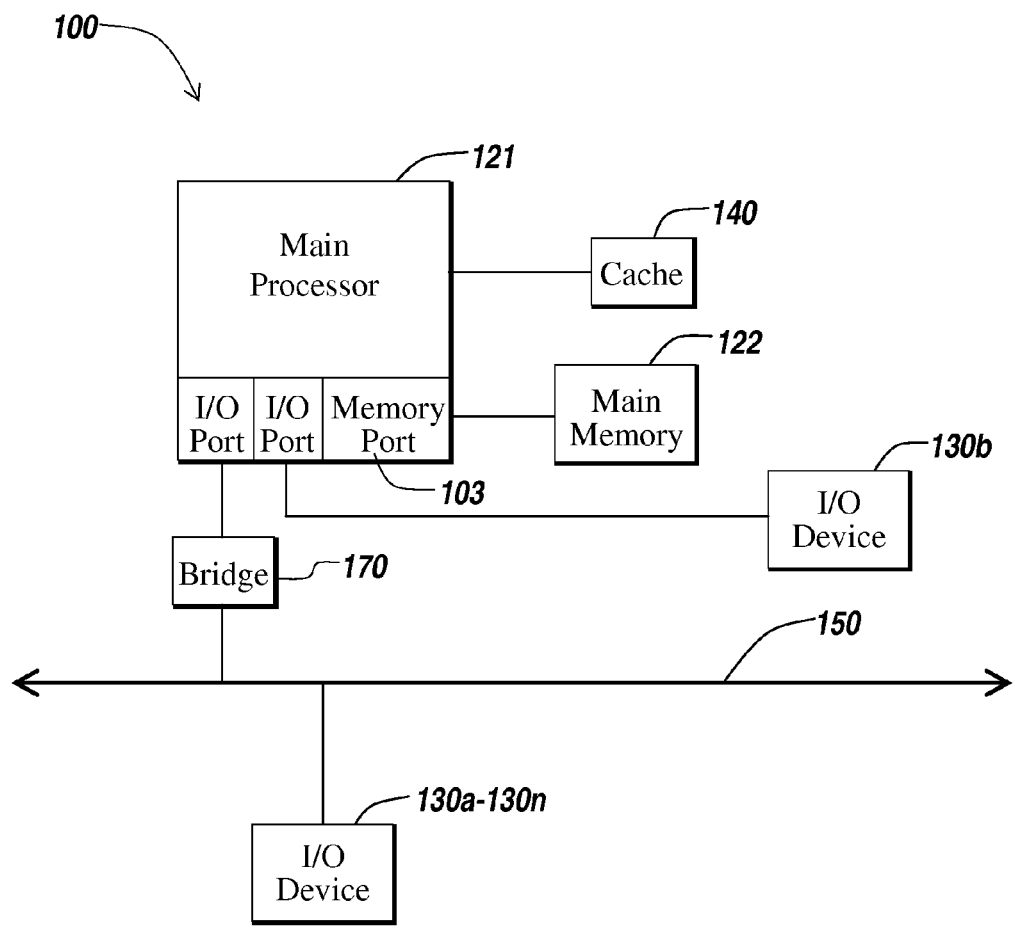

In another embodiment, the guest operating system 110, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 105, as described above The computing device 100 may be deployed as and/or executed on any type and form of computing device, such as a computer, network device or appliance capable of communicating on any type and form of network and performing the operations described herein. FIGS. 1B and 1C depict block diagrams of a computing device 100 useful for practicing an embodiment of methods and systems described herein. As shown in FIGS. 1B and 1C, a computing device 100 includes a central processing unit 121, and a main memory unit 122. As shown in FIG. 1B, a computing device 100 may include a storage device 128, an installation device 116, a network interface 118, an I/O controller 123, display devices 124a-124n, a keyboard 126 and a pointing device 127, such as a mouse. The storage device 128 may include, without limitation, an operating system, software, and, optionally, a client agent. As shown in FIG. 1C, each computing device 100 may also include additional optional elements, such as a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In some embodiments, the central processing unit 121 is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 121, such as Static random access memory (SRAM), Burst SRAM or Synch-Burst SRAM (BSRAM), Dynamic random access memory (DRAM), Fast Page Mode DRAM (FPM DRAM), Enhanced DRAM (EDRAM), Extended Data Output DRAM (EDO DRAM), Burst Extended Data Output DRAM (BEDO DRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1B, the processor 121 communicates with main memory 122 via a system bus 150 (described in more detail below). FIG. 1C depicts an embodiment of a computing device 100 in which the processor communicates directly with main memory 122 via a memory port 103. For example, in FIG. 1C the main memory 122 may be DRDRAM.

FIG. 1C depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1C, the processor 121 communicates with various I/O devices 130 via a local system bus 150. Various buses may be used to connect the central processing unit 121 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 121 may use an Advanced Graphics Port (AGP) to communicate with a display device 124. FIG. 1C depicts an embodiment of a computer 100 in which the main processor 121 communicates directly with I/O device 130b via HYPERTRANSPORT, RAPIDIO, or INFINIBAND communications technology. FIG. 1C also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices include keyboards, mice, trackpads, trackballs, microphones, dials, and drawing tablets. Output devices include video displays, speakers, inkjet printers, laser printers, and dye-sublimation printers. The I/O devices may be controlled by an I/O controller 123 as shown in FIG. 1B. The I/O controller may control one or more I/O devices such as a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices such as the USB Flash Drive line of devices manufactured by Twintech Industry, Inc., of Los Alamitos, Calif.

Referring again to FIG. 1B, the computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, a flash memory drive, tape drives of various formats, USB device, hard-drive or any other device suitable for installing software and programs. The computing device 100 may further comprise a storage device, such as one or more hard disk drives or redundant arrays of independent disks, for storing an operating system and other related software, and for storing application software programs. Optionally, any of the installation devices 116 could also be used as the storage device. Additionally, the operating system and the software can be run from a bootable medium, for example, a bootable CD, such as KNOPPIX, a bootable CD for GNU/Linux that is available as a GNU/Linux distribution from knoppix.net.

Furthermore, the computing device 100 may include a network interface 118 to interface to the network 104 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, CDMA, GSM, WiMax and direct asynchronous connections). In one embodiment, the computing device 100 communicates with other computing devices 100' via any type and/or form of gateway or tunneling protocol such as Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a Fibre-Channel bus, a Serial Attached small computer system interface bus, or a HDMI bus.

A computing device 100 of the sort depicted in FIGS. 1B and 1C typically operates under the control of operating systems, which control scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 3.x, WINDOWS 95, WINDOWS 98, WINDOWS 2000, WINDOWS NT 3.51, WINDOWS NT 4.0, WINDOWS CE, WINDOWS MOBILE, WINDOWS XP, and WINDOWS VISTA, all of which are manufactured by Microsoft Corporation of Redmond, Wash.; MAC OS, manufactured by Apple Computer of Cupertino, Calif.; OS/2, manufactured by International Business Machines of Armonk, N.Y.; and Linux, a freely-available operating system distributed by Caldera Corp. of Salt Lake City, Utah, or any type and/or form of a Unix operating system, among others.

The computer system 100 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 100 has sufficient processor power and memory capacity to perform the operations described herein. For example, the computer system 100 may comprise a device of the IPOD family of devices manufactured by Apple Computer of Cupertino, Calif., a PLAYSTATION 2, PLAYSTATION 3, or PERSONAL PLAYSTATION PORTABLE (PSP) device manufactured by the Sony Corporation of Tokyo, Japan, a NINTENDO DS, NINTENDO GAMEBOY, NINTENDO GAMEBOY ADVANCED or NINTENDO REVOLUTION device manufactured by Nintendo Co., Ltd., of Kyoto, Japan, or an XBOX or XBOX 360 device manufactured by the Microsoft Corporation of Redmond, Wash.

In some embodiments, the computing device 100 may have different processors, operating systems, and input devices consistent with the device. For example, in one embodiment, the computing device 100 is a TREO 180, 270, 600, 650, 680, 700p, 700w, or 750 smart phone manufactured by Palm, Inc. In some of these embodiments, the TREO smart phone is operated under the control of the PalmOS operating system and includes a stylus input device as well as a five-way navigator device.

In other embodiments, the computing device 200 is a mobile device, such as a JAVA-enabled cellular telephone or personal digital assistant (PDA), such as the i55sr, i58sr, i85s, i88s, i90c, i95c1, i335, i365, i570, 1576, i580, i615, i760, i836, i850, i870, i880, i920, i930, ic502, ic602, ic902, i776 or the im1100, all of which are manufactured by Motorola Corp. of Schaumburg, Ill., the 6035 or the 7135, manufactured by Kyocera of Kyoto, Japan, or the i300 or i330, manufactured by Samsung Electronics Co., Ltd., of Seoul, Korea. In some embodiments, the computer system 200 is a mobile device manufactured by Nokia of Finland, or by Sony Ericsson Mobile Communications AB of Lund, Sweden.

In still other embodiments, the computing device 100 is a Blackberry handheld or smart phone, such as the devices manufactured by Research In Motion Limited, including the Blackberry 7100 series, 8700 series, 7700 series, 7200 series, the Blackberry 7520, the Blackberry PEARL 8100, the 8700 series, the 8800 series, the Blackberry Storm, Blackberry Bold, Blackberry Curve 8900, Blackberry Pearl Flip. In yet other embodiments, the computing device 100 is a smart phone, Pocket PC, Pocket PC Phone, or other handheld mobile device supporting Microsoft Windows Mobile Software. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

In some embodiments, the computing device 100 is a digital audio player. In one of these embodiments, the computing device 100 is a digital audio player such as the Apple IPOD, IPOD Touch, IPOD NANO, and IPOD SHUFFLE lines of devices, manufactured by Apple Computer of Cupertino, Calif. In another of these embodiments, the digital audio player may function as both a portable media player and as a mass storage device. In other embodiments, the computing device 100 is a digital audio player such as the DigitalAudioPlayer Select MP3 players, manufactured by Samsung Electronics America, of Ridgefield Park, N.J., or the Motorola m500 or m25 Digital Audio Players, manufactured by Motorola Inc. of Schaumburg, Ill. In still other embodiments, the computing device 100 is a portable media player, such as the ZEN VISION W, the ZEN VISION series, the ZEN PORTABLE MEDIA CENTER devices, or the Digital MP3 line of MP3 players, manufactured by Creative Technologies Ltd. In yet other embodiments, the computing device 100 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4MPEG-4 (H.264/MPEG-4 AVC) video file formats.

In some embodiments, the computing device 100 includes a combination of devices, such as a mobile phone combined with a digital audio player or portable media player. In one of these embodiments, the computing device 100 is a smartphone, for example, an iPhone manufactured by Apple, Inc., or a Blackberry device, manufactured by Research In Motion Limited. In yet another embodiment, the computing device 100 is a laptop or desktop computer equipped with a web browser and a microphone and speaker system, such as a telephony headset. In these embodiments, the computing devices 100 are web-enabled and can receive and initiate phone calls. In other embodiments, the communications device 100 is a Motorola RAZR or Motorola ROKR line of combination digital audio players and mobile phones.

A computing device 100 may be a file server, application server, web server, proxy server, appliance, network appliance, gateway, application gateway, gateway server, virtualization server, deployment server, SSL VPN server, or firewall. In some embodiments, a computing device 100 provides a remote authentication dial-in user service, and is referred to as a RADIUS server. In other embodiments, a computing device 100 may have the capacity to function as either an application server or as a master application server. In still other embodiments, a computing device 100 is a blade server.

In one embodiment, a computing device 100 may include an Active Directory. The computing device 100 may be an application acceleration appliance. For embodiments in which the computing device 100 is an application acceleration appliance, the computing device 100 may provide functionality including firewall functionality, application firewall functionality, or load balancing functionality. In some embodiments, the computing device 100 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In other embodiments, a computing device 100 may be referred to as a client node, a client machine, an endpoint node, or an endpoint. In some embodiments, a client 100 has the capacity to function as both a client node seeking access to resources provided by a server and as a server node providing access to hosted resources for other clients.

In some embodiments, a first, client computing device 100a communicates with a second, server computing device 100b. In one embodiment, the client communicates with one of the computing devices 100 in a server farm. Over the network, the client can, for example, request execution of various applications hosted by the computing devices 100 in the server farm and receive output data of the results of the application execution for display. In one embodiment, the client executes a program neighborhood application to communicate with a computing device 100 in a server farm.

A computing device 100 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on the computing device 100. In some embodiments, the application may be a server-based or a remote-based application executed on behalf of a user of a first computing device by a second computing device. In other embodiments, the second computing device may display output data to the first, client computing device using any thin-client or remote-display protocol, such as the Independent Computing Architecture (ICA) protocol manufactured by Citrix Systems, Inc. of Ft. Lauderdale, Fla.; the Remote Desktop Protocol (RDP) manufactured by the Microsoft Corporation of Redmond, Wash.; the X11 protocol; the Virtual Network Computing (VNC) protocol, manufactured by AT&T Bell Labs; the SPICE protocol, manufactured by Qumranet, Inc., of Sunnyvale, Calif., USA, and of Raanana, Israel; the Net2Display protocol, manufactured by VESA, of Milpitas, Calif.; the PC-over-IP protocol, manufactured by Teradici Corporation, of Burnaby, B.C.; the TCX protocol, manufactured by Wyse Technology, Inc., of San Jose, Calif.; the THINC protocol developed by Columbia University in the City of New York, of New York, N.Y.; or the Virtual-D protocols manufactured by Desktone, Inc., of Chelmsford, Mass. The application can use any type of protocol and it can be, for example, an HTTP client, an FTP client, an Oscar client, or a Telnet client. In other embodiments, the application comprises any type of software related to voice over Internet protocol (VoIP) communications, such as a soft IP telephone. In further embodiments, the application comprises any application related to real-time data communications, such as applications for streaming video and/or audio.

Figure 1D:
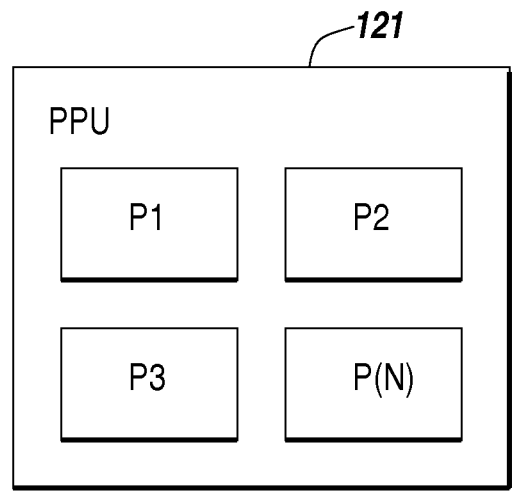

As shown in FIG. 1D, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multicore microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1E:
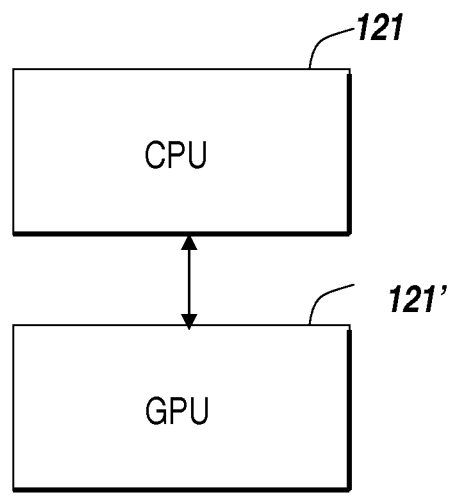

In some embodiments, the computing device 100 may comprise a graphics processing unit. In one of these embodiments, depicted in FIG. 1E, the computing device 100 includes at least one central processing unit 121 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

Figure 1F:
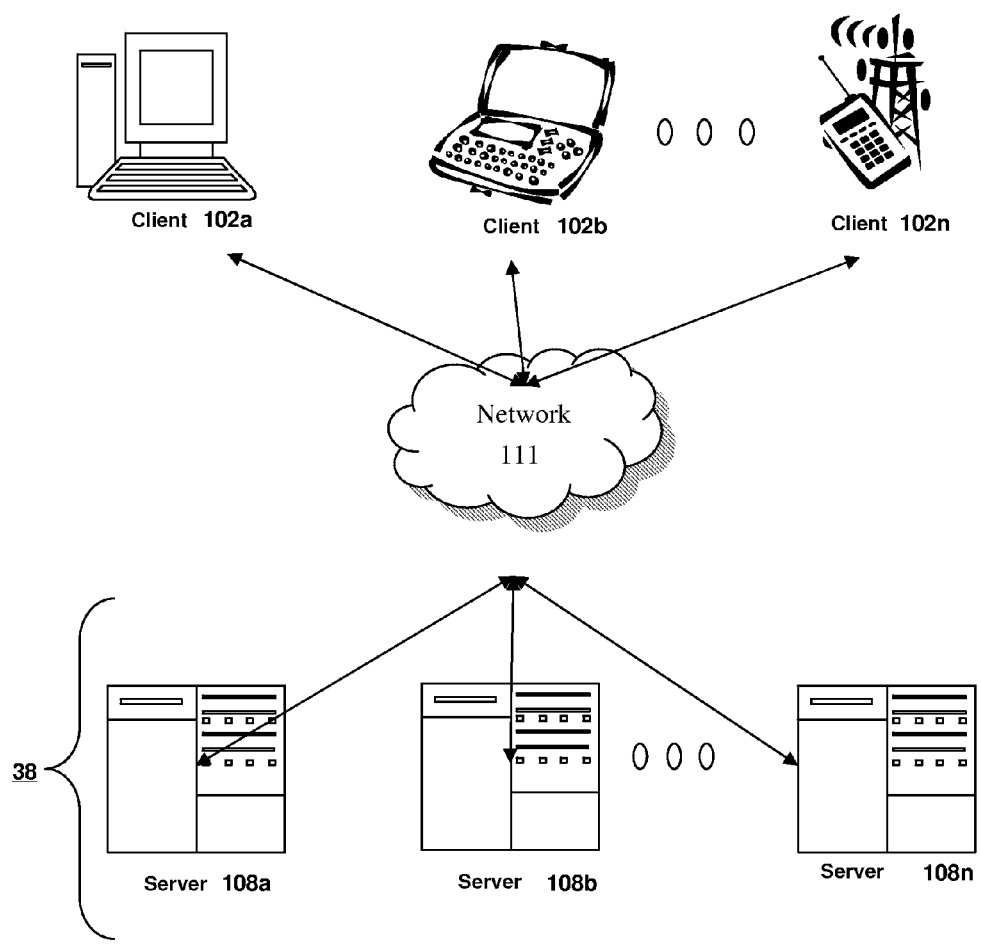
FIG. 1F is a block diagram depicting an embodiment of a network environment comprising local machines in communication with remote machines.

Referring now to FIG. 1F, an embodiment of a network environment is depicted. In brief overview, the network environment comprises one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 108a-108n (also generally referred to as server(s) 108 or remote machine(s) 108) via one or more networks 111. In some embodiments, a client 102 has the capacity to function as both a client node seeking access to resources provided by a server and as a server providing access to hosted resources for other clients 102a-102n.

Although FIG. 1F shows a network 111 between the clients 102 and the servers 108, the clients 102 and the servers 108 may be on the same network 111. The network 111 can be a local-area network (LAN), such as a company Intranet, a metropolitan area network (MAN), or a wide area network (WAN), such as the Internet or the World Wide Web. In some embodiments, there are multiple networks 111 between the clients 102 and the servers 108. In one of these embodiments, a network 111' (not shown) may be a private network and a network 111 may be a public network. In another of these embodiments, a network 111 may be a private network and a network 111' a public network. In still another embodiment, networks 111 and 111' may both be private networks.

The network 111 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 111 may comprise a wireless link, such as an infrared channel or satellite band. The topology of the network 111 may be a bus, star, or ring network topology. The network 111 may be of any such network topology as known to those ordinarily skilled in the art capable of supporting the operations described herein. The network may comprise mobile telephone networks utilizing any protocol or protocols used to communicate among mobile devices, including AMPS, TDMA, CDMA, GSM, GPRS or UMTS. In some embodiments, different types of data may be transmitted via different protocols. In other embodiments, the same types of data may be transmitted via different protocols.

In some embodiments, the system may include multiple, logically-grouped servers 108. In one of these embodiments, the logical group of servers may be referred to as a server farm 38. In another of these embodiments, the servers 108 may be geographically dispersed. In other embodiments, a server farm 38 may be administered as a single entity. In still other embodiments, the server farm 38 comprises a plurality of server farms 38. The servers 108 within each server farm 38 can be heterogeneous—one or more of the servers 108 can operate according to one type of operating system platform (e.g., WINDOWS NT, manufactured by Microsoft Corp. of Redmond, Wash.), while one or more of the other servers 108 can operate on according to another type of operating system platform (e.g., Unix or Linux).

The servers 108 of each server farm 38 do not need to be physically proximate to another server 108 in the same server farm 38. Thus, the group of servers 108 logically grouped as a server farm 38 may be interconnected using a wide-area network (WAN) connection or a metropolitan-area network (MAN) connection. For example, a server farm 38 may include servers 108 physically located in different continents or different regions of a continent, country, state, city, campus, or room. Data transmission speeds between servers 108 in the server farm 38 can be increased if the servers 108 are connected using a local-area network (LAN) connection or some form of direct connection.

Server 108 may be a file server, application server, web server, proxy server, appliance, network appliance, gateway, application gateway, gateway server, virtualization server, deployment server, SSL VPN server, or firewall. In some embodiments, a server 108 provides a remote authentication dial-in user service, and is referred to as a RADIUS server. In other embodiments, a server 108 may have the capacity to function as either an application server or as a master application server. In still other embodiments, a server 108 is a blade server. In yet other embodiments, a server 108 executes a virtual machine providing, to a user or client computer 102, access to a computing environment.

In one embodiment, a server 108 may include an Active Directory. The server 108 may be an application acceleration appliance. For embodiments in which the server 108 is an application acceleration appliance, the server 108 may provide functionality including firewall functionality, application firewall functionality, or load balancing functionality. In some embodiments, the server 108 comprises an appliance such as one of the line of appliances manufactured by the Citrix Application Networking Group, of San Jose, Calif., or Silver Peak Systems, Inc., of Mountain View, Calif., or of Riverbed Technology, Inc., of San Francisco, Calif., or of F5 Networks, Inc., of Seattle, Wash., or of Juniper Networks, Inc., of Sunnyvale, Calif.

In some embodiments, a server 108 executes an application on behalf of a user of a client 102. In other embodiments, a server 108 executes a virtual machine, which provides an execution session within which applications execute on behalf of a user or a client 102. In one of these embodiments, the execution session is a hosted desktop session. In another of these embodiments, the execution session provides access to a computing environment, which may comprise one or more of: an application, a plurality of applications, a desktop application, and a desktop session in which one or more applications may execute.

In some embodiments, a client 102 communicates with a server 108. In one embodiment, the client 102 communicates directly with one of the servers 108 in a server farm 38. In another embodiment, the client 102 executes a program neighborhood application to communicate with a server 108 in a server farm 38. In still another embodiment, the server 108 provides the functionality of a master node. In some embodiments, the client 102 communicates with the server 108 in the server farm 38 through a network 111. Over the network 111, the client 102 can, for example, request execution of various applications hosted by the servers 108a-108n in the server farm 38 and receive output of the results of the application execution for display. In some embodiments, only the master node provides the functionality required to identify and provide address information associated with a server 108b hosting a requested application.

In one embodiment, the server 108 provides the functionality of a web server. In another embodiment, the server 108a receives requests from the client 102, forwards the requests to a second server 108b and responds to the request by the client 102 with a response to the request from the server 108b. In still another embodiment, the server 108 acquires an enumeration of applications available to the client 102 and address information associated with a server 108' hosting an application identified by the enumeration of applications. In yet another embodiment, the server 108 presents the response to the request to the client 102 using a web interface. In one embodiment, the client 102 communicates directly with the server 108 to access the identified application. In another embodiment, the client 102 receives output data, such as display data, generated by an execution of the identified application on the server 108.

In some embodiments, the server 108 or a server farm 38 may be running one or more applications, such as an application providing a thin-client computing or remote display presentation application. In one embodiment, the server 108 or server farm 38 executes an application any portion of the CITRIX ACCESS SUITE by Citrix Systems, Inc., such as the METAFRAME, CITRIX PRESENTATION SERVER, CITRIX XENAPP, or CITRIX XENDESKTOP, and/or any of the MICROSOFT WINDOWS Terminal Services manufactured by the Microsoft Corporation. In another embodiment, the application is an ICA client, developed by Citrix Systems, Inc. of Fort Lauderdale, Fla. In still another embodiment, the server 108 may run an application, which, for example, may be an application server providing email services such as MICROSOFT EXCHANGE manufactured by the Microsoft Corporation of Redmond, Wash., a web or Internet server, or a desktop sharing server, or a collaboration server. In yet another embodiment, any of the applications may comprise any type of hosted service or products, such as GOTOMEETING provided by Citrix Online Division, Inc. of Santa Barbara, Calif., WEBEX provided by WebEx, Inc. of Santa Clara, Calif., or Microsoft Office LIVE MEETING provided by Microsoft Corporation of Redmond, Wash.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 108. In one embodiments the server 108 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to voice over internet protocol (VoIP) communications, such as a soft IP telephone. In further embodiments, the application comprises any application related to real-time data communications, such as applications for streaming video and/or audio.

In some embodiments, a first computing device 100a executes an application on behalf of a user of a client computing device 100b. In other embodiments, a computing device 100a executes a virtual machine, which provides an execution session within which applications execute on behalf of a user or a client computing device 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

Figure 2A:
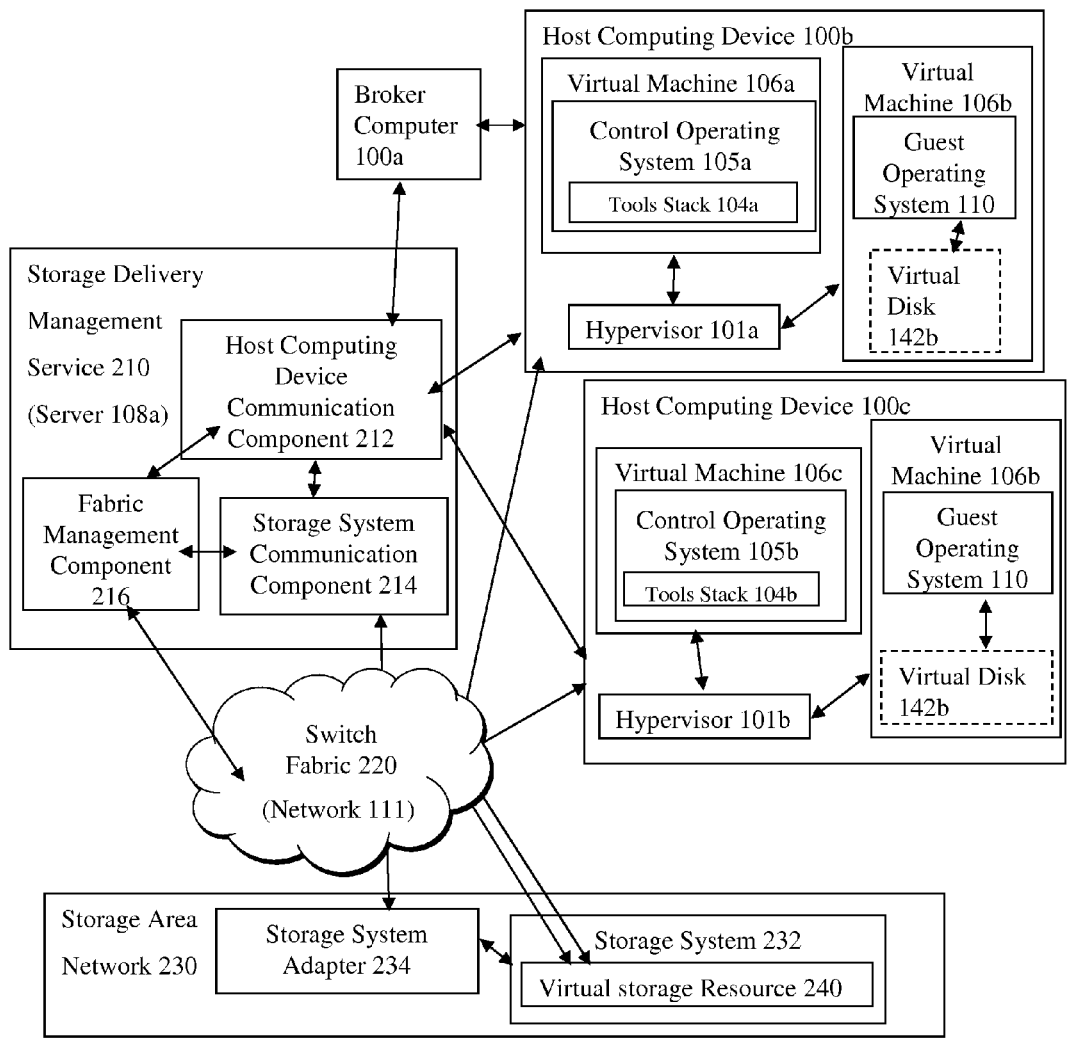
FIG. 2A is a block diagram depicting an embodiment of a system for automated management of virtual resources in a cloud computing environment.

Referring now to FIG. 2A, a block diagram depicts one embodiment of a system for automated provisioning, by a storage delivery management service, of virtual machines in a cloud computing environment. In brief overview, the system includes a storage delivery management service 210, a host computing device communication component 212, a storage system communication component 214, a storage area network 230, and a storage system 232. The system may include a fabric management component 216. The system may include a plurality of computing devices 100, a plurality of virtual machines 106, a plurality of hypervisors 101, and a plurality of communications components. It should be understood that the system may optionally provide multiple ones of any or each of those components. The plurality of computing devices 100 may each be provided as computing devices 100, described above in connection with FIGS. 1A-D.

The storage system communication component 214 executed by the storage delivery management service 210, communicates with a storage system adapter 234 in a storage area network 230 to identify a storage system 232 in the storage area network 230, and directs the automated provisioning of a virtual storage resource 240 on the identified storage system 232, the storage system 232 providing resources for provisioning the virtual storage resource 240. The host computing device communication component 212 receives a request for access by a host computing device 100b to the virtual storage resource 240, and responds, to the host computing device 100b, with an identification of a network port of the identified storage system 232 and an identification of the provisioned virtual storage resource 240.

Referring now to FIG. 2A, and in greater detail, the system includes a storage delivery management service 210. In one embodiment, the storage delivery management service 210 is referred to as a virtual storage manager service. In some embodiments, the storage delivery management service 210 is a computer program executing on a server 108a or other computing device 100 to provide automated provisioning functionality. In other embodiments, the storage delivery management service 210 is a hardware server 108a providing automated provisioning functionality. In further embodiments, the storage delivery management service 210 executes within a virtual machine executing on a computing device 100, such as a server 108a.

In one embodiment, the host computing device communication component 212, the storage system communication component 214, the fabric management component 216, and other communications components are provided as part of the storage delivery management service 210. In another embodiment, at least one communication component or management component is provided as a plug-in, module, or other self-contained executable file or program intended to operate within the larger, host program of the storage delivery management service 210. In still another embodiment, the storage delivery management service 210 may include one or more interfaces for communicating with each of the components. In some embodiments, a communication component, such as the host computing device communication component 212, the storage system communication component 214, or the fabric management component 216, may be provided as byte code, such as an application written in the byte code programming language JAVA.

In one embodiment, the storage delivery management service 210 includes an administration console. In another embodiment, the storage delivery management service 210 is in communication with an administration console. In still another embodiment, the administration console includes a user interface accessible over a network 111; for example, the system may include a web-based graphical user interface for accessing the functionality of the storage delivery management service 210 through the administration console. In still even another embodiment, a user, such as a network administrator, accesses the administration console to request services provided by the storage delivery management service 210. In yet another embodiment, the administration console is provided as a MICROSOFT Management Console (MMC)- based graphical user interface for interacting with the functionality provided by the storage delivery management service 210.

In one embodiment, the storage delivery management service 210 includes an interface for interacting with the administration console. In another embodiment, the storage delivery management service 210 includes an interface for receiving, across a network 111, requests for services or functionality provided by the storage delivery management service 210. For example, the storage delivery management service 210 may provide a web services interface communicating with computing devices 100 according to a Simple Object Access Protocol (SOAP), or according to a framework such as .NET, which includes a library of pre-coded solutions to common programming problems and a virtual machine that manages the execution of programs written specifically for the framework. In some embodiments, the storage delivery management service 210 provides a central interface in a service-oriented architecture for communicating with other computing devices in the system.

In some embodiments, the storage delivery management service 210 and the administration console execute on a single server 108a. In other embodiments, the storage delivery management service 210 and the administration console execute on separate servers 108a. In further embodiments, the storage delivery management service 210 and the administration console execute on separate virtual machines within a single server 108a.

In one embodiment, the host computer 100b and the host computer 100c reside on a first network 111a and the storage area network 230 resides on a second network 111b. In another embodiment, the host computer 100b and the host computer 100c communicate with one or more storage systems 232 in the storage area network 230 across a network 111, which may be provided as a switch fabric 220. In still another embodiment, the switch fabric 220 is part of the storage area network 230. In yet another embodiment, the switch fabric 220 is a network 111.

In some embodiments, the switch fabric 220 is an interconnected network of switching devices. In one of these embodiments, the switch fabric 220 contains a plurality of input and output ports for communicating with a switch in the network of switching devices. In another of these embodiments, the switch fabric 220 is an interconnect architecture for redirecting data within a system from one of the ports in a line card to another port in a different line card. In other embodiments, the switch fabric 220 is a combination of hardware and software and may include the switching units (individual boxes) in a node, the integrated circuits that they contain, and the programming that allows switching paths to be controlled.

In some embodiments, the storage system adapter 234 resides on a server 108b in the storage area network 230. In other embodiments, the storage system adapter 234 is an interface through which external components may retrieve data about the storage area network 230, such as an identification of a storage system 232, an identification of functionality or resources provided by a storage system 232, or a status of a storage system 232. In further embodiments, a provider of a storage system 232 provides a storage system adapter 234 for communicating with the server.

Figure 2B:
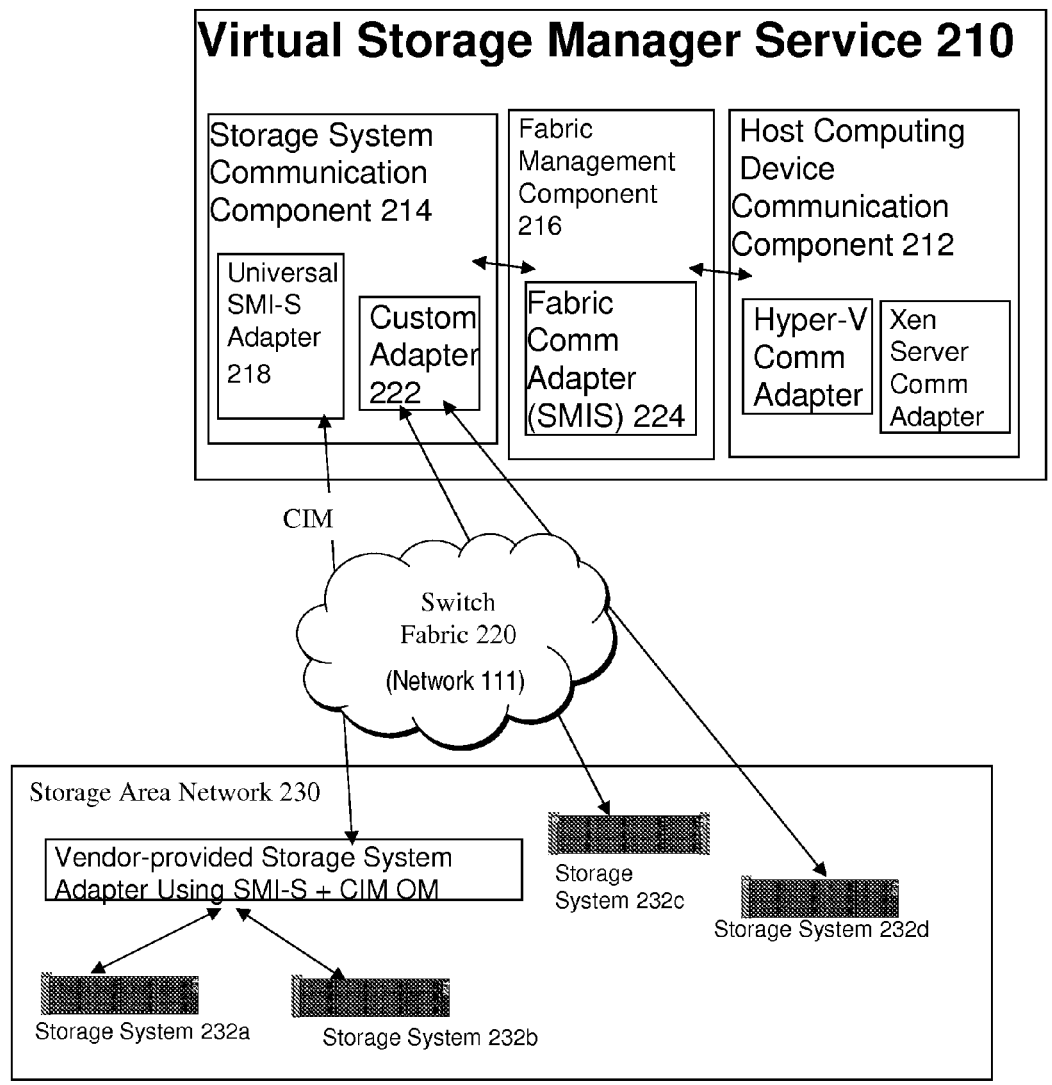
FIG. 2B is a block diagram depicting an embodiment of a system in which a storage delivery management service includes a storage system communication component.

Referring now to FIG. 2B, a block diagram depicts one embodiment of a storage delivery management service 210 including a storage system communication component 214. In some embodiments, the storage system communication component 214 includes at least one storage adapter for communicating with a storage system 232. In one of these embodiments, the storage adapter communicates with the storage adapter 234 provided by the storage system 232. In another of these embodiments, the storage system communication component 214 includes an adapter using an application programming interface to communicate with the storage adapter 232. In still another of these embodiments, the storage adapter provided as part of the storage system communication component 214 and the storage adapter 234 provided by the storage system 232 communicate according to a storage system adapter protocol, such as the Web-Based Enterprise Management protocol (WBEM), which provides a standard mechanism for retrieving data from storage systems. In some embodiments, the storage adapter provided by the storage system communication component 214 uses a standard protocol to retrieve Common Information Model Object Manager (CIM OM) data associated with a storage system 232a or 232b. In other embodiments, a provider of a storage system 232c or 232d creates a custom storage system adapter 222 and provides the custom storage system adapter 222 to the storage delivery management service 210 for use in communicating with a storage system 232c or 232d, or with the storage adapter 234.

In one embodiment, a storage system 232 includes one or more hardware devices storing data and providing access to stored data. In another embodiment, the storage system 232 is referred to as a storage array. In still another embodiment, the storage system 232 includes a partition on one or more hardware devices; for example, a plurality of hardware devices may each include a physical storage element (such as a disk drive) on which each of the plurality of hardware devices reserve a portion (such as a partition) for storing data for a particular host computing device 100. In yet another embodiment, a plurality of hardware devices in a storage area network 230 from which a storage system 232 may be created is referred to as a storage pool.

In one embodiment, the storage system 232 creates and stores a virtual storage resource for access by a remotely-located computing device 100. In another embodiment, the virtual storage resource may be a virtual disk for use by a virtual machine executing on a host computing device 100b. In still another embodiment, the virtual storage resource may be referred to as a storage node.

In one embodiment, one or more hardware devices in the storage system 232 are storage devices such as those provided by EMC Corporation of Hopkinton, Mass., Emulex Corporation of Costa Mesa, Calif., Fujitsu Siemens Computers GmBH of Maarssen, The Netherlands, Hewlett-Packard Company, of Palo Alto, Calif., Hitachi, Ltd., of Tokyo, Japan, IBM Corporation of Armonk, N.Y., NetApp, Inc., of Sunnyvale, Calif., NexSan Technologies of Thousand Oaks, Calif., Quantum Corporation, of San Jose, Calif., and Sanrad, Inc., of Mahwah, N.J.

In one embodiment, the storage system communication component 214 receives a request for provisioning of a virtual storage resource 240. The storage system communication component 214 communicates with a storage system adapter 234 in a storage area network 230 to identify a storage system 232 in the storage area network 230. In one embodiment, the storage system communication component 214 uses an application programming interface to communicate with the storage system adapter 234.

The storage system communication component 214 directs the automated provisioning of a virtual storage resource 240 on the identified storage system 232, the storage system 232 providing resources for provisioning the virtual storage resource 240. In one embodiment, the storage system communication component 214 transmits, to the identified storage system 232, an identification of the at least one network port on the first computing device 100b to associate with the virtual storage resource 240. In one embodiment, the storage system communication component 214 transmits, to the identified storage system 232, an identification of at least one network port on a second computing device 100c, to which a virtual machine accessing the virtual storage resource 240 has migrated.

In some embodiments, the storage system communication component 214 configures the storage system 232 to communicate, according to a first communications protocol, with a first physical computing device executing a virtual machine. In one of these embodiments, the storage system communication component 214 includes functionality for requesting from at least one of the storage system 232 and the storage system adapter 234 an enumeration of communications protocols supported by the storage system 232; for example, the storage system communication component 214 may transmit an instruction to the storage system adapter 234 to request CIM OM data from the storage system 232 identifying supported communications protocols. In another of these embodiments, the storage system communication component 214 configures the storage system 232 to communicate, according to a second communications protocol, with a second physical computing device executing a virtual machine. In still another of these embodiments, the first and second communications protocols are the same protocols. In yet another of these embodiments, the first and second communications protocols are different protocols.

In other embodiments, the storage system communication component 214 receives a notification of a migration of the virtual machine from the first physical computing device, to the second physical computing device. In one of these embodiments, the storage system communication component 214 configures the storage system 232 to communicate, according to the second communications protocol, with the second physical computing device upon receiving the notification.

In further embodiments, the storage system communications component 214 provides the host computing device communication component 212 an identification of a communication protocol supported by both a computing device 100 and a storage system 232. In one of these embodiments, the host computing device communication component 212 transmits, to a computing device 100, an identification of the storage system providing access to a provisioned virtual resource. In another of these embodiments, the host computing device communication component 212 transmits, to a computing device 100, an identification of a communication protocol for use in communicating with the storage system 232.

Figure 2C:
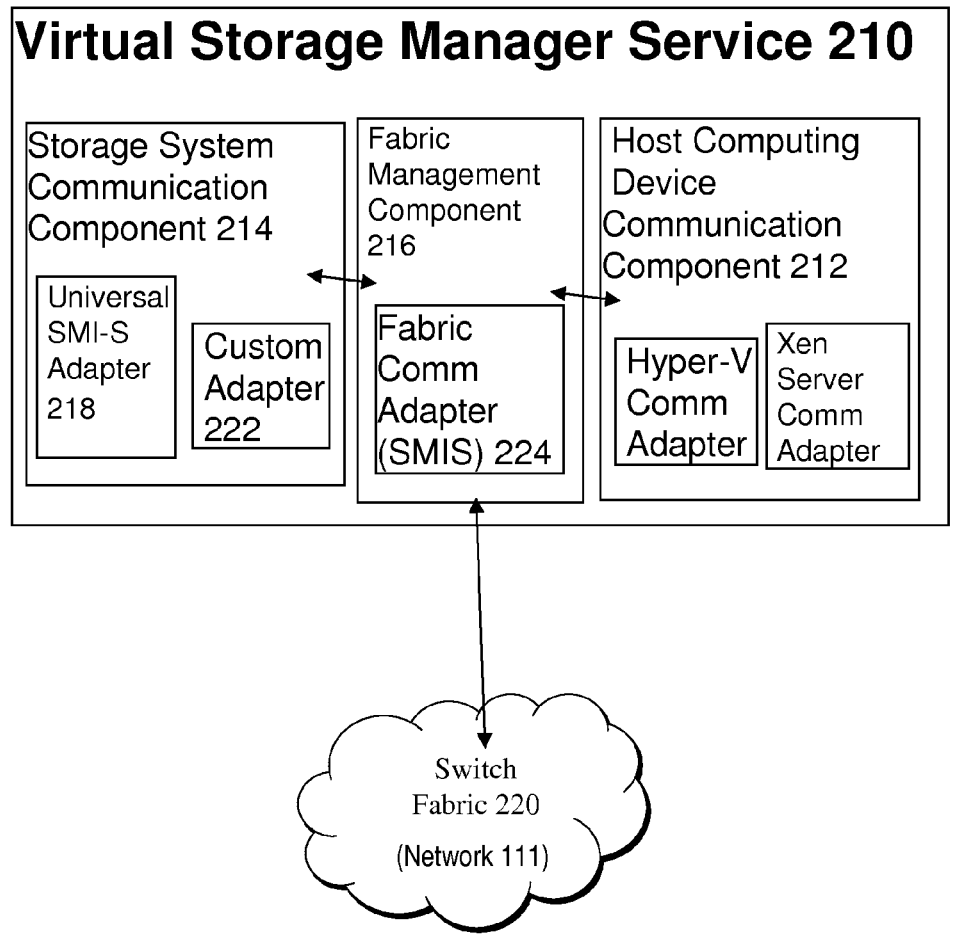
FIG. 2C is a block diagram depicting one embodiment of a system in which the storage delivery management service includes a fabric management component.

Referring now to FIG. 2C, a block diagram depicts one embodiment of a system in which the storage delivery management service 210 includes a fabric management component 216. In one embodiment, the fabric management component 216, executed by the storage delivery management service 210, generates, on at least one switch in a switch fabric 220, an access control list including the identification of at least one networking port of the identified storage system 232 and an identification of at least one network port on a host computing device 100. As shown in FIG. 2C, the fabric management component 216 communicates with the switch fabric 220. In some embodiments the storage area network 230 includes the switch fabric 220. In one of these embodiments, the storage area network 230 is both the switch fabric 220 and one or more networked storage systems 232. In other embodiments, the storage area network 230 is a network of storage systems 232 and the switch fabric 220 is a separate network from the storage area network 230. In one of these embodiments, the switch fabric 220 is a network 111 that connects the storage area network 230 to a host computing device 100—or to a network 111a on which the host computing device 100 resides. Although depicted as separate elements in FIGS. 2A, 2B and 2C, in some embodiments, the storage area network 230 is a single network including both a plurality of storage systems 232 and a plurality of switches forming a switch fabric 220. In some embodiments, the storage area network 230 is a network providing network-attached storage.

In one embodiment, the switch fabric 220 includes one or more Fibre Channel switches. In another embodiment, the switch fabric 220 includes switches communicating according to the Internet Small Computer System Interface (iSCSI) protocol. The switch fabric 220 may be heterogeneous, including switches that communicate according to either Fibre Channel protocols or Internet Small Computer System Interface (iSCSI) protocols. In another embodiment, a switch in the switch fabric 220 routes data received from servers 108 or other computing devices 100 that are associated with one or more storage systems 232 to a network port on a particular storage system 232.

In some embodiments, the switch fabric 220 includes a switch fabric controller. In one of these embodiments, the switch fabric controller includes a storage system adapter 234 with which components outside of the storage area network 230—such as the fabric management component 216 or the storage system communication component 214—may communicate. In another of these embodiments, the storage system adapter 234 resides on the storage system 232. In other embodiments, the switch fabric 220 includes a fabric name server with which the fabric management component 216 communicates.

In some embodiments, the fabric management component 216 includes a fabric communication adapter 224. In one of these embodiments, the fabric manager component 216 includes a Fibre Channel Host Bus Adapters (HBAs). In one of these embodiments, the Fibre Channel HBA handles the processing of the Fibre Channel stack using onboard Application-Specific Integrated Circuits (ASICs). In other embodiments, the fabric management component 216 modifies zoning information stored by the switch fabric. In still other embodiments, a zone control interface provided by a fabric management component in the switch fabric 220 allows the fabric management component 216 to create and modify zoning information. In further embodiments, the fabric management component 216 communicates with a switch in the switch fabric 220 according to a standard, such as the Storage Management Initiative Specification (SMI-S) to access data, which may also be formatted and retrieved according to a standard, such as CIM OM. In one of these embodiments, the switch in the switch fabric 220 executes a management service providing an application programming interface with which the fabric management component 216 interacts.

Zones include identifications of devices such as storage systems 232 and the host computing devices 100 authorized to access data stored by one or more storage systems 232. Identifications of devices may include unique identifiers of the device itself, such as its unique World Wide Name (WWN), or of a port on the device, such as a network port for a storage system 232. Typically, devices that communicate with each other—such as a storage system 232 and the host computing devices 100 authorized to access data stored by the storage system 232—are identified on a zone list, which may also be referred to as an access control list. In some embodiments, if a device is not identified on the zone list, it will not be allowed to access data stored by other devices on the zone list. In other embodiments, the zone list includes an identification of a partition on a storage system 232—for example, a logical unit or virtual disk or other virtual storage resource may be provided on one of a plurality of partitions on the storage system 232 and a port is assigned to each such partition for use in identifying the partition in an access control list. Such functionality is typically referred to as LUN masking. In one embodiment, when a host computing device 100 or server 108 communicates with or about a storage system 232—for example, to request an identification of the storage system 232, to modify an access control list identifying the storage system 232, or to access data provided by one or more storage systems—the computing device requests an identification of each of the devices listed on any access control list that also identifies the requesting computing device.

In some embodiments, the fabric management component 216 provides functionality for dynamically modifying access control lists to include identifications of virtual machines authorized to access a storage system 232. In another of these embodiments, the fabric management component 216 provides functionality for dynamically modifying access control lists to include identifications of host computing devices 100 authorized to access a storage system 232. In still another of these embodiments, the fabric management component 216 provides functionality for dynamically modifying access control lists to include identifications of host computing devices 100 executing virtual machines authorized to access a storage system 232. In yet another of these embodiments, the fabric management component 216 provides functionality for modifying an access control list identifying a network port of a first computing device executing a virtual machine to include an identification of a network port on a second computing device to which the virtual machine has migrated.

In other embodiments, the fabric management component 216 is optional. In one of these embodiments, for example, the storage delivery management service 210 interacts with a storage area network 230 providing functionality according to the iSCSI protocol instead of according to the Fibre Channel standards, in which case fabric management is not required because the storage delivery management service 210 and host computing devices 100 communicate directly with storage systems 232 without requiring modification to or management of a switch fabric 220.

Figure 2D:
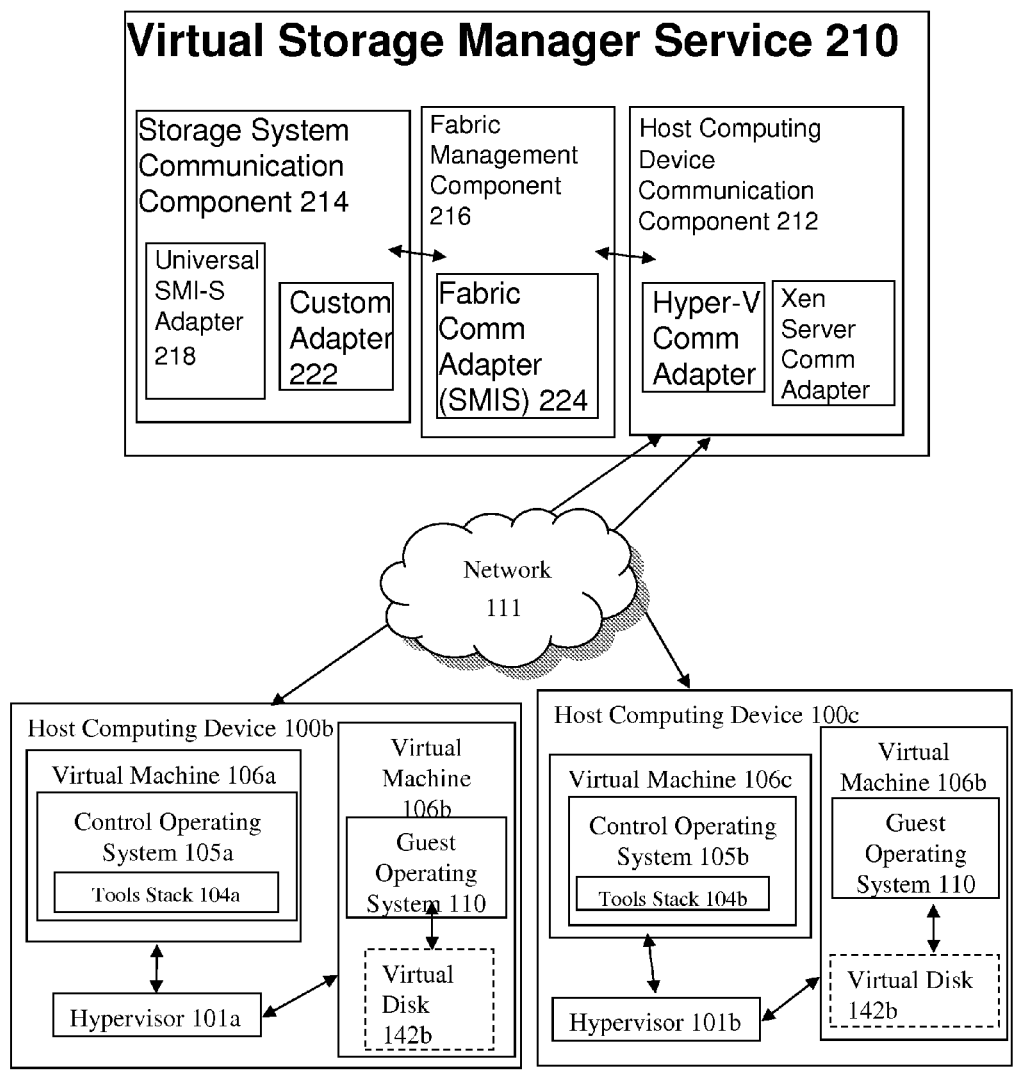
FIG. 2D is a block diagram depicting one embodiment of a system in which the storage delivery management service includes a host computing device communication component.

Referring now to FIG. 2D, a block diagram depicts one embodiment of a system in which the storage delivery management service 210 executes the host computing device communication component 212. The host computing device communication component 212 receives a request for access, by a host computing device 100, to the virtual storage resource 240. The host computing device communication component 212 responds to the request with the identification of a network port of the identified storage system 232 and an identification of the provisioned virtual storage resource 240. In some embodiments, a host computing device 100 communicates directly with a storage system 232 using the identified network port of the identified storage system 232. In other embodiments, the host computing device 100 communicates with a storage system 232 through a storage network 230, which may include the switch fabric 220.

In some embodiments, the host computing device communication component 212 includes a communication adapter for communicating with a host computing device 100. In other embodiments, the host computing device communication component 212 includes a communication adapter for communicating with a virtual machine 106a executing on a host computing device 100. In one of these embodiments, the computing device 100 includes a hypervisor, which receives communication data from the host computing device communication component 212 and transmits the received communication data to the control operating system 105 in the virtual machine 106a for processing. In another of these embodiments, the virtual machine 106a transmits a response from the control operating system 105 to the host computing device communication component 212. In still another of these embodiments, the control operating system 105 and the host computing device communication component 212 exchange communication related to the provisioning or management of a virtual machine 106b executing on the computing device 100. As described above in connection with FIG. 1A, a hypervisor may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, the host computing device communication component 212 includes a communication adapter for transmitting data to a hypervisor. In one of these embodiments, and as depicted in FIG. 2D, the host computing device communication component 212 includes a separate communication adapter for transmitting data to each different kind of hypervisor. In another of these embodiments, the host computing device communication component 212 includes a universal communication adapter (not depicted) for transmitting data to each different kind of hypervisor.

In some embodiments, the host computing device communication component 212 receives, from a broker server 100a, a request for provisioning of the virtual storage resource for the computing device 100b comprising at least one network port. In one of these embodiments, the host computing device communication component 212 transmits the request to the storage system communication component 214. In another of these embodiments, the host computing device communication component 212 transmits, to the broker server 100a, an identification of the provisioned virtual resource 240. In still another of these embodiments, the host computing device communication component 212 includes an interface for receiving requests from the broker server 101a; for example, the interface may be a graphical user interface displayed to a user of the broker server 100a over a network connection, or a web services interface, such as the SOAP/.NET interfaces described above. In other embodiments, the host computing device communication component 212 communicates with a control operating system 105. In still other embodiments, the host computing device communication component 212 accesses an application programming interface to communicate with the host computing devices 100.

In some embodiments, the storage delivery management service 210 executes a virtual machine migration component (not depicted). In one of these embodiments, the virtual machine migration component receives an indication of a migration of the virtual machine from the first computing device 100b to the second computing device 100c. In another of these embodiments, the virtual machine migration component receives a request for a migration of the virtual machine from the first computing device 100b to the second computing device 100c. In still another of these embodiments, the virtual machine migration component receives an identification of at least one network port on the second computing device 100c. In still another of these embodiments, the virtual machine migration component transmits the identification of the at least one network port on the second computing device 100c to the storage system communication component 214; the storage system communication component 214 may transmit, to the storage system 232, the identification of the at least one network port on the second computing device 100c to associate with the virtual storage resource 240. In still even another of these embodiments, the virtual machine migration component transmits the identification of the provisioned virtual storage resource 240 and the identification of the at least one network port of the storage system 232 to the second computing device 100c. In yet another of these embodiments, the virtual machine migration component transmits the identification of the at least one network port of the storage system 232 and the identification of the at least one network port on the second computing device 100c to the fabric manager communication component 216. In further embodiments, the fabric management component 216, executed by the storage delivery management service 210, generates, on at least one switch in a switch fabric 220, an access control list including the identification of at least one networking port of the identified storage system 232 and an identification of at least one network port on the host computing device 100b or 100c.

In some embodiments, the virtual machine migration component provides functionality for storing a state of execution of a virtual machine on a computing device 100b. In one of these embodiments, the virtual machine migration component transmits an instruction to terminate execution of the virtual machine. In another of these embodiments, the virtual machine migration component migrates the stored state of execution of the virtual machine and a virtual machine image associated with the terminated virtual machine to a second computing device 100c. In other embodiments, the virtual machine migration component is provided by a control operating system 105 that executes within a virtual machine 106 hosted on the same server 108a as the storage delivery management service 210. In further embodiments, the virtual machine migration component is provided by a control operating system 105 that executes within a virtual machine 106 hosted on a server 108b and is in communication with the storage delivery management service 210.

In some embodiments, the host computing device communication component 212 includes the virtual machine migration component. In other embodiments, the host computing device communication component 212 provides the functionality provided by the virtual machine migration component.

In some embodiments, a host computing device 100b and a host computing device 100c reside on a network 111a. In one of these embodiments, the host computing devices 100 execute virtual machines providing a computing environment to a user of the host computing device 100. In another of these embodiments, the virtual machines execute resources and transmit output data generated by the resources to a client computer 102 for a display on the client computer 102 to a user of the client computer 102. The client computer 102 may reside on the same network 111a as the host computing devices 100, or on a separate network 111b. In other embodiments, the host computing device 100 retrieves data needed to execute a virtual machine—for example, a virtual machine image or virtual storage resource—from a computing device 100 residing on the network 111. In still other embodiments, however, the host computing device 100 retrieves data needed to execute the virtual machine from a storage system 232 in the storage network 230, which may be a network 111c. In further embodiments, a provider of the host computing device 100 is a customer of a provider of the storage area network 230, receiving storage services from the provider of the storage area network 230. In one of these embodiments, the storage service provider may be providing storage services over one or more networks 111 (such as the storage area network 230, the switch fabric 220, and other intermediate networks 111b between the storage service provider and the provider of the host computers 100). In such an embodiment, the storage service provider may be said to be providing cloud computing services, since they are providing access to storage resources and storage services over the "cloud" of the Internet.

Figure 3:
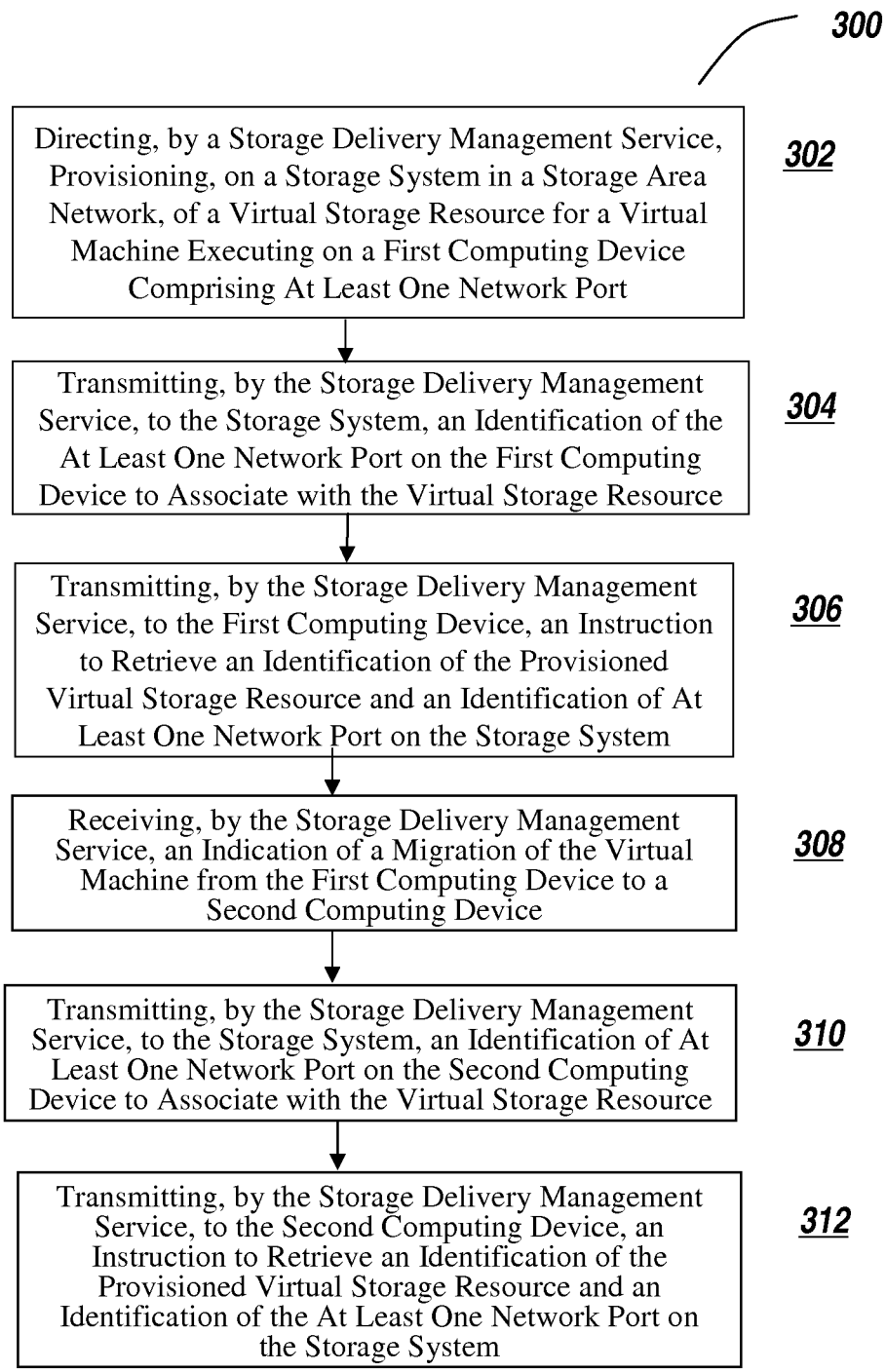
FIG. 3 is a flow diagram depicting an embodiment of a method for automated management of virtual resources in a cloud computing environment.

Referring now to FIG. 3, a flow diagram depicts one embodiment of a method for automated provisioning of virtual resources in a cloud computing environment. In brief overview, the method 300 includes directing, by a storage delivery management service, provisioning, on a storage system in a storage area network, of a virtual storage resource for a virtual machine executing on a first computing device comprising at least one network port (302). The method includes transmitting, by the storage delivery management service, to the storage system, an identification of the at least one network port on the first computing device to associate with the virtual storage resource (304). The method includes transmitting, by the storage delivery management service, to the first computing device, an instruction to retrieve an identification of the provisioned virtual storage resource and an identification of at least one network port on the storage system (306). The method includes receiving, by the storage delivery management service, an indication of a migration of the virtual machine from the first computing device to a second computing device (308). The method includes transmitting, by the storage delivery management service, to the storage system, an identification of at least one network port on the second computing device to associate with the virtual storage resource (310). The method includes transmitting, by the storage delivery management service, to the second computing device, an instruction to retrieve an identification of the provisioned virtual storage resource and an identification of the at least one network port on the storage system (312).

Referring now to FIG. 3, and in greater detail, a storage delivery management service 210 directs provisioning, on a storage system 232 in a storage area network 230, of a virtual storage resource 240 for a virtual machine 106 executing on a first computing device 100b comprising at least one network port (302). In some embodiments, the storage delivery management service 210 receives a request for provisioning of the virtual storage resource for the first computing device comprising at least one network port. In one of these embodiments, the storage delivery management service 210 receives the request for provisioning of the virtual storage resource 240 from a broker server 100a on behalf of a computing device 100b; the computing device 100b includes at least one network port. In another of these embodiments, the storage delivery management service 210 receives the request for provisioning of the virtual storage resource 240 from a host computing device 100b hosting a virtual machine. In still another of these embodiments, the storage delivery management service 210 identifies a storage system in a storage area network, the storage system providing resources for provisioning the virtual storage resource. In still even another of these embodiments, the storage delivery management service 210 communicates with a storage adapter 234 to identify the storage system 232. In yet another of these embodiments, the storage system communication component 214 requests an identification of an available storage system 232 providing access to resources for provisioning the virtual storage resource; for example, the storage system communication component 214 may request an enumeration of all storage systems 232 that are able to create and store a virtual disk allocated a specified amount of physical disk drive space.

In some embodiments, new virtual storage resources are provisioned. In other embodiments, existing virtual storage resources are re-assigned from one host computing device 100*b* to a second host computing device 100*c*. In still other embodiments, a new virtual storage resource is provisioned by copying into the virtual storage resource the contents of an existing virtual storage resource. In one of these embodiments, the existing virtual storage resource is cloned.

In some embodiments, new virtual storage resources are provisioned on a short term basis. In one of these embodiments, for example, a host computing device 100*b* may request provisioning of additional virtual storage resources to support a virtual machine that requires additional resources—additional virtual disk space, for example—but only on a temporary basis. In another of these embodiments, the virtual machine may have temporarily exceeded its allocated use of a previously provisioned virtual storage resource or begin executing a process which will result in the virtual machine exceeding allocated resources. In still another of these embodiments, virtual storage resources may be provided on a short term basis to support a virtual machine that requires additional resources.

In some embodiments, the storage delivery management service 210 receives a request to implement n_port identification virtualization when provisioning the virtual storage resource. In one of these embodiments, the request includes an identification of a virtual host bus adapter allocated to a virtual machine 106 executing on the computing device. In another of these embodiments, the storage delivery management service 210 receives a request for access to a provisioned virtual storage resource. In another of these embodiments, the storage delivery management service 210 receives a request for provisioning of a virtual storage resource for the virtual machine 106. In still another of these embodiments, the storage delivery management service 210 assigns, to the virtual host bus adapter, a unique identifier. In still even another of these embodiments, the storage delivery management service 210 transmits, to the first computing device 100*b*, an identification of the unique identifier. In yet another of these embodiments, the storage delivery management service 210 transmits, to the storage system 232, the unique identifier of the virtual host bus adapter. In some of these embodiments, the storage delivery management service 210 transmits, to a switch in the switch fabric 220 an identification of the unique identifier of the virtual host bus adapter for inclusion in an access control list allowing the virtual machine 106 and the storage system 232. In other embodiments, the storage system 232 provides, to the virtual host bus adapter, access to the provisioned virtual storage resource. In further embodiments, the virtual host bus adapter communicates with the storage system 232 to provide, to a virtual machine executing on the first computing device 100*b*, access to the virtual storage resource.

In some embodiments, the storage delivery management service 210 receives a request for provisioning of the virtual storage resource, identifies a storage system 232 capable of provisioning the requested virtual storage resource, and directs the provisioning of the virtual storage resource. In one of these embodiments, the storage system communication component 214 transmits an instruction to the storage system 232, via the storage system adapter 234, to create the virtual storage resource. In another of these embodiments, the storage system 232 transmits, to the storage system communication component 214, via the storage system adapter 234, an identification of the provisioned virtual storage resource.

In some embodiments, after the virtual storage resource 240 is created, the storage delivery management service 210 communicates with the storage system adapter 234 to request that the storage system 232 assign the new virtual storage resource 240 to one or more ports on the host computing device. In one of these embodiments, this is referred to as Logical Unit Number (LUN) masking and mapping. In another of these embodiments, the storage system 232 is asked to return information needed to identify the assigned virtual storage resource 240. In still another of these embodiments, the host computing device 100*b* receives a request by the storage delivery management service 210 to connect the virtual storage resource 240 to the appropriate virtual machine. In other embodiments, the storage delivery management service 210 receives an identification of a provisioned storage resource by issuing SCSI inquiry commands to retrieve the various mode pages that store the identification. In one of these embodiments, using that information, the storage delivery management service correlates identification in the mode page to the virtual storage resource 240 created in the storage system 232 via the storage adapter 234.

The storage delivery management service 210 transmits, to the storage system 232, an identification of the at least one network port on the first computing device to associate with the virtual storage resource (304). In one embodiment, a request for provisioning the virtual storage resource included the identification of the at least one network port. In another embodiment, the storage delivery management service 210 transmits, to the storage system 232, an identification of a virtual port associated with a virtual machine executing on the first computing device 100*b*. In still another embodiment, the storage delivery management service 210 transmits, to the storage system 232, an identification of a physical port associated with a virtual machine executing on the first computing device 100*b*.

In some embodiments, the storage delivery management service 210 configures the switch fabric 220 to allow the host computing device 100 to access the storage system 232. In one of these embodiments, the fabric management component 216 generates, on at least one switch in a switch fabric, an access control list including an identification of at least one network port on the storage system and an identification of the at least one network port on the computing device. In another of these embodiments, the fabric management component 216 modifies an existing access control list to include an identification of the at least one network port on the computing device. In still another of these embodiments, the fabric management component 216 modifies an existing access control list to include an identification of the at least one network port on the storage system 232.

The storage delivery management service 210 transmits, to the first computing device, an instruction to retrieve an identification of the provisioned virtual storage resource and an identification of at least one network port on the storage system (306). In one embodiment, the first computing device 100*b* receives a notification that a virtual storage resource has been provisioned for the virtual machine 106 executed by the first computing device 100*b*. In another embodiment, the first computing device 100*b* receives, from the storage delivery management service 210, an identification of the storage system 232 provisioning the virtual storage resource. In still another embodiment, the first computing device 100*b* receives an instruction to request an update to an enumeration of available storage resources. In yet another embodiment, the storage delivery management service 210 transmits, to the broker computing device 100*a*, an instruction for redirection to the first computing device 100*b*.

In some embodiments, the first computing device 100*b* receives an instruction to request an enumeration of available virtual storage resources. In one of these embodiments, the first computing device 100*b* transmits, to the storage adapter 234, a request for available virtual storage resources. In another of these embodiments, the first computing device 100*b* transmits, to the storage area network 230, a request for available virtual storage resources. In still another of these embodiments, the first computing device 100*b* transmits, to the switch fabric 220, a request for available virtual storage resources. In such an embodiment, the switch fabric 220 may retrieve an enumeration of access control lists that list the first computing device 100*b*—or a network port of the first computing device 100*b*, or a network port of a virtual machine 106 executed by the first computing device 100*b*—and provides the first computing device 100*b* with an enumeration of storage systems 232 that the first computing device 100*b* may access.

In one embodiment, the first computing device 100*b* establishes a connection to the identified at least one network port on the storage system 232. In another embodiment, the first computing device 100 requests, from a switch fabric 220, establishment of a connection to the identified at least one network port on the storage system 232. In still another embodiment, at least one switch in the switch fabric 220 establishes a connection between the identified at least one network port on the first computing device and the identified at least one network port on the storage system. In still another embodiment, the first computing device 100*b* provides, to the virtual machine 106, access to the provisioned virtual storage resource.

The storage delivery management service 210 receives an indication of a migration of the virtual machine from the first computing device to a second computing device (308). In one embodiment, the storage delivery management service 210 receives a request for migration of the virtual machine 106. In another embodiment, the storage delivery management service 210 receives the request from a broker computer 100*a*. In still another embodiment, the storage delivery management service 210 receives the request from a virtual machine migration component.

The storage delivery management service 210 transmits, to the storage system 232, an identification of the at least one network port on the second computing device to associate with the virtual storage resource (310). In one embodiment, the storage delivery management service 210 transmits, to the switch fabric 220, the identification of the at least one network port on the second computing device to associate with the virtual storage resource. In another embodiment, the storage delivery management service 210 service communicates with at least one switch in the switch fabric 220, to generate or modify an access control list allowing communication between the storage system 232 and the at least one network port on the second computing device. In still another embodiment, the storage delivery management service 210 removes associations between the storage system 232 and the identified network port on the first computing device. In yet another embodiment, the storage delivery management service 210 transmits, to the storage system 232, an identification of the at least one network port, responsive to receiving the request for migration of the virtual machine.

The storage delivery management service 210 transmits, to the second computing device, an identification of the provisioned virtual storage resource and an identification of at least one network port on the storage system (312). In one embodiment, the second computing device 100*c* establishes a connection with the storage system 232 to access the virtual storage resource, responsive to the received identification of the provisioned virtual storage resource. In another embodiment, the second computing device 100*c* establishes a connection with the storage system 232 to access the virtual storage resource, responsive to the received identification of the at least one network port on the storage system 232. In still another embodiment, the second computing device 100*c* requests, from the switch fabric 220, establishment of a connection to the storage system 232. In yet another embodiment, the second computing device 100*c* provides, to the virtual machine 106*b* access to the virtual storage resource. In some embodiments, the second computing device 100*c* retrieves a copy of the virtual storage resource—for example, by making a local copy of a virtual disk stored on the storage system 232, and on which the virtual machine 106*b* may execute. In other embodiments, the second computing device 100*c* makes requests for data stored in the virtual storage resource 240, over a network 111, which may include the switch fabric 220, rather than making a local copy of the virtual storage resource.

Figure 4:
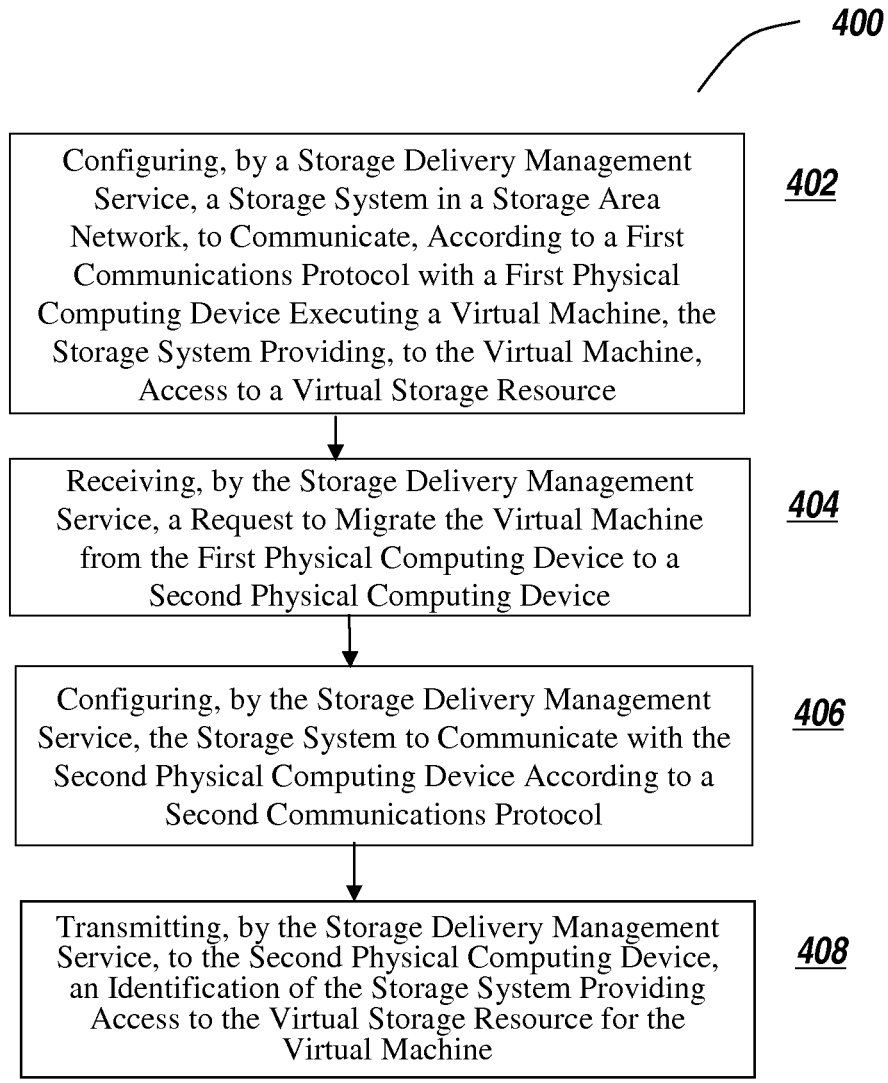
FIG. 4 is a flow diagram depicting an embodiment of a method for dynamically switching between communications protocols.

Referring now to FIG. 4, a flow diagram depicts one embodiment of a method for dynamically switching between communications protocols. In brief overview, the method 400 includes configuring, by a storage delivery management service, a storage system in a storage area network, to communicate, according to a first communications protocol with a first physical computing device executing a virtual machine, the storage system providing, to the virtual machine, access to a virtual storage resource (402). The method includes receiving, by the storage delivery management service, a request to migrate the virtual machine from the first physical computing device to a second physical computing device (404). The method includes configuring, by the storage delivery management service, the storage system to communicate with the second physical computing device according to a second communications protocol (406). The method includes transmitting, by the storage delivery management service, to the second physical computing device, an identification of the storage system providing access to the virtual storage resource for the virtual machine (408).

Referring now to FIG. 4, and in greater detail, the storage delivery management service 210 configures a storage system in a storage area network, to communicate, according to a first communications protocol with a first physical computing device executing a virtual machine, the storage system providing, to the virtual machine, access to a virtual storage resource (402). In one embodiment, the host computing device communication component 212 requests an identification of communications protocols supported by the first physical computing device 100*b*. In another embodiment, the storage system communication component 214 requests an identification of communications protocols supported by the storage system 232. In still another embodiment, the storage system communication component 214 transmits, to the storage system adapter 234, the request for the identification. In still even another embodiment, the storage delivery management service 210 identifies a communication protocol supported by both the first computing device 100*b* and by the storage system 232. In yet another embodiment, the storage system communication component 214 identifies a communication protocol supported by both the first computing device 100*b* and by the storage system 232.

In one embodiment, the storage system communication component 214 configures the storage system 232 to communicate with the first physical computing device 100*b* according to the first communication protocol in providing access to the virtual storage resource 240. In another embodiment, the storage system communication component 214 transmits, to the storage adapter 234, an identification of the storage system 232, an identification of at least one network port on the first physical computing device 100*b*, and an identification of a communication protocol to use in communicating with the first physical computing device 100*b*.

The storage delivery management service 210 receives a request to migrate the virtual machine from the first physical computing device to a second physical computing device (404). In one embodiment, the host computing device communication component 212 receives the request to migrate the virtual machine. In another embodiment, the storage delivery management service 210 receives an identification of a migration process that has begun. In still another embodiment, the migration of the virtual machine depends upon the ability of the storage system 232 to provide access to the virtual storage resource to the second physical computing device 100*c*; for example, the virtual storage resource may be a virtual disk upon which the virtual machine 106 executes and without which the virtual machine 106 ought not execute.

The storage delivery management service 210 configures the storage system to communicate with the second physical computing device according to a second communications protocol (406). In one embodiment, the storage delivery management service 210 requests, from the second physical computing device 100*c*, an identification of at least one communications protocol supported by the second physical computing device 100*c*. In another embodiment, the host computing device communication component 212 requests, from the second physical computing device 100*c*, an identification of at least one communications protocol supported by the second physical computing device 100*c*. In still another embodiment, the storage delivery management service 210 determines that the second physical computing device 100*c* supports a different communication protocol than the communication protocol supported by the first computing device 100*b*. In still even another embodiment, the storage system communication component 214 receives, from the host computing device communication component 212, a notification of the migration of the virtual machine to the second physical computing device 100*c*. In yet another embodiment, the storage system communication component 214 receives an identification of the communication protocol supported by the second physical computing device 100*c*.

In one embodiment, the storage delivery management service 210 requests, from the storage system 232, an enumeration of communication protocols supported by the storage system 232. In another embodiment, the storage system communication component 214 requests, from the storage system 232, an enumeration of communication protocols supported by the storage system 232. In still another embodiment, the storage delivery management service 210 determines that the storage system 232 supports the communication protocol supported by the second computing device 100*c*.

In some embodiments, the communication protocols that the computing devices use to communicate with the storage system 232 are storage protocols. In one of these embodiments, the storage protocol is a Fibre Channel-based protocol; for example, the storage protocol may be the Fibre Channel Protocol, which is an interface protocol of SCSI on the Fibre Channel, or the Fibre Channel over IP protocol, which provides a tunneling approach and is defined in the Internet Engineering Task Force (IETF) document RFC 3821. In another of these embodiments, the storage protocol is an iSCSI protocol.

The storage delivery management service 210 transmits, to the second physical computing device, an identification of the storage system providing access to the virtual storage resource for the virtual machine (408). In one embodiment, the host computing device communication component 212 transmits, to the second physical computing device 100*c*, the identification of the storage system providing access to the virtual storage resource for the virtual machine. In another embodiment, the host computing device communication component 212 transmits, to the second physical computing device 100*c*, the identification of the communication protocol for use in communicating with the storage system 232. In still another embodiment, the host computing device communication component 212 transmits, to the second physical computing device 100*c*, a confirmation of support by the storage system 232 of a default communication protocol used by the second computing device 100*c*.

In one embodiment, the fabric management component 216 configures an access control list stored by a switch in the switch fabric 220 to include an identification of at least one network port of the second physical computing device 100*c*. In another embodiment, the storage delivery management service 210 transmits an identification to a broker server 108*a* to migrate the virtual machine to the second physical computing device 100*c*. In still another embodiment, the storage delivery management service 210 migrates the virtual machine to the second physical computing device 100*c*. In some embodiments, the migration occurs as the virtual machine continues to execute; this may be referred to as live migration. In other embodiments, the migration occurs after a state of execution of the virtual machine has been stored and execution of the virtual machine terminates. In further embodiments, the storage delivery management service 210 disables access, by the first physical computing device 100*b*, to the virtual storage resource provided by the storage system 232. In one of these embodiments, the storage delivery management service 210 transmits, via the storage system adapter 234, to the storage system 232 an indication that the first physical computing device 100*b*—or a network port of the first physical computing device 100*b*—is no longer authorized to access the virtual storage resource. In another of these embodiments, the storage delivery management service 210 transmits, via the fabric management component 216, a request to a switch in the switch fabric 220 to remove the first physical computing device 100*b*—or a network port of the first physical computing device 100*b*—from an access control list associating the first physical computing device 100*b* with the storage system 232.

In some embodiments in which a virtual machine is migrated from one physical computing device 100*b* to a second physical computing device 100*b*, the migration occurs between heterogeneous machines providing different functionality and supporting different communications protocols. In one of these embodiments, the methods and systems described herein provide functionality for dynamically switching communication protocol configurations on storage systems accessed by the virtual machine, resulting in improved migration processes.

Figure 5A:
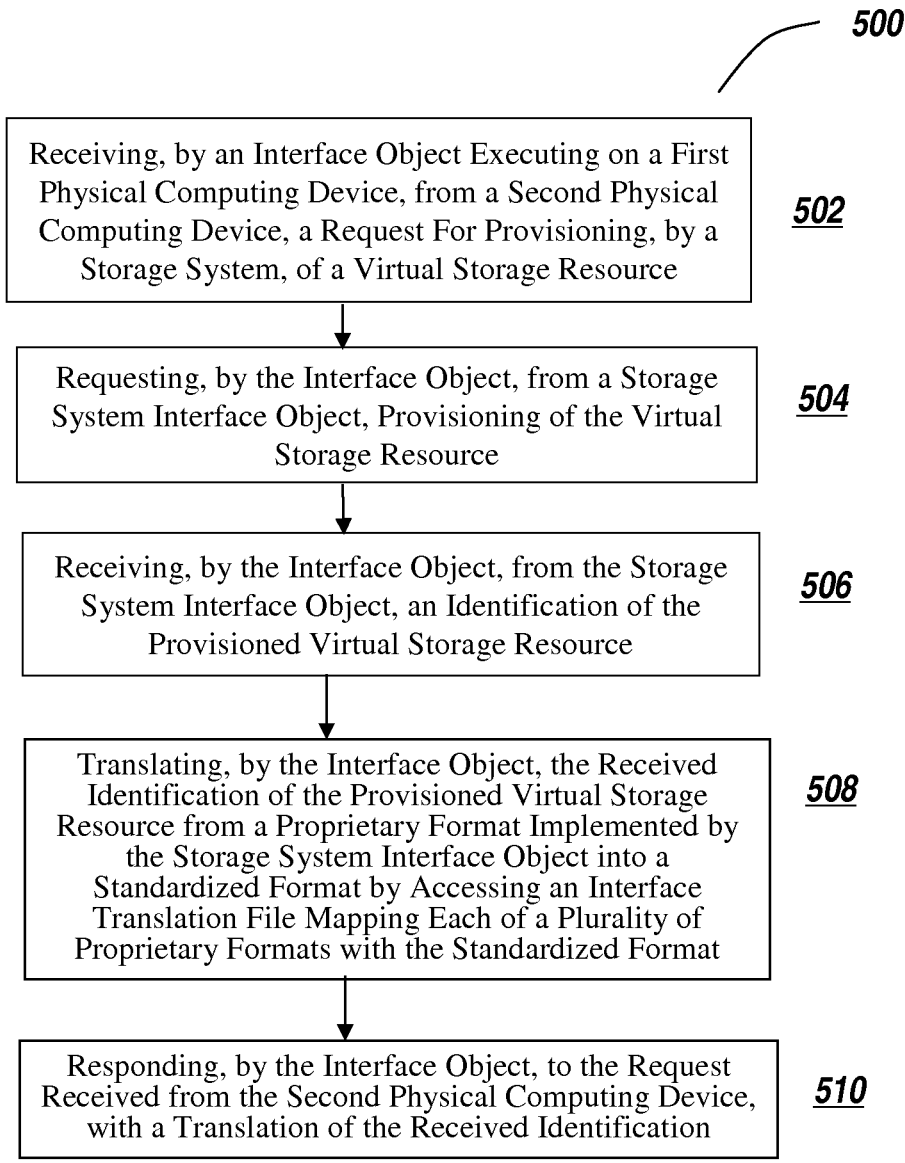
FIG. 5A is a flow diagram depicting one embodiment of a method for retrieving data from a storage system in a cloud computing environment.

Referring now to FIG. 5A, a flow diagram depicts one embodiment of a method for providing translations of data retrieved from a storage system in a cloud computing environment. The method 500 includes receiving, by an interface object executing on a first physical computing device, a request for provisioning of a virtual storage resource by a storage system (502). The method includes requesting, by the interface object, from a storage system interface object, provisioning of the virtual storage resource (504). The method includes receiving, by the interface object, from the storage system interface object, an identification of the provisioned virtual storage resource (506). The method includes translating, by the interface object, the identification of the provisioned virtual storage resource from a proprietary format implemented by the storage system interface object into a standardized format by accessing an interface translation file mapping each of a plurality of proprietary formats with the standardized format (508). The method includes responding, by the interface object, to the request received from the second physical computing device, with a translation of the received identification (510).

In some embodiments, the storage delivery management service 210 receives a request for provisioning of a virtual storage resource 502. In one of these embodiments, the storage delivery management service 210 transmits the request to the storage system communication component 214. In another of these embodiments, in response, the storage system communication component 214 generates an identification of the storage system 232, the identification formatted for processing by the broker computer 100a. For example, and in still another of these embodiments, the storage system adapter 234 may transmit an identification of the storage system 232 in a vendor-specific format; the storage system communication component 214 may translate that identification into a format that the broker computer 100a can process.

Referring now to FIG. 5A, and in greater detail, an interface object executing on a first physical computing device receives, from a second physical computing device, a request for provisioning, by a storage system, of a virtual storage resource (502). In one embodiment, the storage system communication component 214 includes an interface object 218 such as a universal SMI-S adapter 218. In another embodiment, the interface object 218 receives the request for provisioning of the virtual storage resource 240 from the storage system communication component 214. In still another embodiment, the interface object 218 receives the request for provisioning of the virtual storage resource 240 from the storage delivery management service 210. In yet another embodiment, the interface object 218 receives the request, indirectly or directly, from a broker computer 100a.

The method includes requesting, by the interface object, from a storage system interface object, provisioning of the virtual storage resource (504). In one embodiment, the interface object 218 communicates with an interface object provided to retrieve data about and issue commands to a storage system 232 in a storage area network 230. In another embodiment, the interface object is an adapter 234 as described above. In still another embodiment, the adapter 234 provides a mechanism for external communication with a storage system 232, and thus provides an interface to the storage system 232. In yet another embodiment, a vendor or other provider of a storage system 232 creates an adapter that allows systems such as the storage delivery management service 210 to access functionality provided by the storage system 232. In some embodiments, the interface object 218 and the interface object 234 communicate according to a protocol for retrieving CIM OM data or according to a specification such as SMI-S. In one of these embodiments, the interface object 234 may format data according to an implementation of the protocol by a provider of the storage systems 232 of SMI-S. In other embodiments, the provider of the storage system 232 may have implemented a customized version of SMI-S. In one of these embodiments, for example, the provider may provide additional functionality other than what is in the SMI-S, or may have specified a formatting detail about which the SMI-S was silent.

The method includes receiving, by the interface object, from the storage system interface object, an identification of the provisioned virtual storage resource (506). In one embodiment, the interface object 218 receives, from the storage system interface object 234, an identification of a provisioned virtual storage resource 506. In another embodiment, the interface object 218 receives, from the storage system interface object 234, an identification of an identified storage system 232. In still another embodiment, the interface object 218 receives, from the storage system interface object 234, a response to a request for data associated with the storage system 232. In still even another embodiment, the interface object 218 receives, from the storage system interface object 234, a response to a request for access to functionality provided by the storage system 232. In yet another embodiment, the interface object 218 receives, from the storage system interface object 234, a response to an instruction transmitted for execution by the storage system 232; for example, the interface object 218 may receive confirmation of execution of an instruction to provision a virtual storage resource. In some embodiments, by way of example, the interface object 218 receives authentication of an entity for which storage credentials were provided. In other embodiments, and as discussed in further detail below in connection with FIG. 5D, the interface object 218 receives a response to a request for a characteristic of the storage area network 230, such as an identification of available storage systems, storage nodes, pools, virtualized storage resources, or other resources. In further embodiments, the data received from the storage system interface object 234 is in a vendor-specific format and the same type of responses from different vendors of different storage systems 232 may have varying formats.

In one embodiment, an area of variability in vendor SMI-S provider implementations relates to where identifiers for storage systems, storage pools and storage volumes are stored within a data model provided in response to a request for the identifiers. In another embodiment, although much of that is well documented in the SMI-S specification, in practice, there is much variability between implementations as to which attributes are used for storing disk identifiers and storage system serial numbers, both of which are pieces of data used by the storage delivery management service 210 for device correlation purposes. In still another embodiment, the generation of a standardized identifier for vendor data can be configured by using custom settings in the interface translation file.

The method includes translating, by the interface object, the identification of the provisioned virtual storage resource from a proprietary format implemented by the storage system interface object into a standardized format by accessing an interface translation file mapping each of a plurality of proprietary formats with the standardized format (508). In one embodiment, a vendor of a storage system 232 provides an interface translation file, which is a configurable data file that describes how to translate data from a vendor-specific format to a standard format. In another embodiment, an entity managing the storage delivery management service 210 creates a version of the interface translation file, which may include a template for completion by a provider, and the provider of a storage system 232 completes the interface translation file so that the interface translation file includes a mapping between data requested by the storage delivery management service 210 and the interface object 234. In still another embodiment, the interface translation file contains a plurality of mappings for translating data from each of a plurality of providers of storage systems, resulting in a single file that allows the storage delivery management service 210 to translate data from a plurality of vendor-specific formats into a single, universal format for processing by the storage delivery management service 210, its subcomponents, and the systems with which it interacts. In yet another embodiment, providing a mapping that describes how to translate data rather than requiring generation of a new interface object 218 from each provider of a storage system is more efficient and cost-effective for both the provider of the storage system 232 and the administrator of the storage delivery management service 210. In some embodiments, the interface translation file is a dynamically extensible file written in a language such as the eXtensible Markup Language (XML). In other embodiments, the interface translation file may be updated by the provider of the storage system 232 upon providing new or modified functionality in the storage system 232. Appendix A includes, without limitation, a description of some of the types of information associated with a storage system for which a vendor may include a translation within an XML translation file.

In some embodiments, when creating an interface translation file, a vendor may opt to rely on default values; for example, a vendor may receive a template interface translation file from the virtual storage manager service 210 with default values listed. In one of these embodiments, as a result, during translation, the interface object 218 will search the SMI-S standard locations for attributes and objects that it needs to access. In another of these embodiments, the optimization features described herein are optional.

In other embodiments, customization features exposed by the interface translation file (which may be referred to as a vendor options file, or VOF) allow a virtual storage manager service 210 to take advantage of vendor-specific properties and class names to, for example, more accurately interpret the meaning of those properties, and/or filter lists of certain classes according to "subtypes". In one of these embodiments, additional properties in a given object can relieve the client of the expense of needing to perform additional queries in order to completely assemble all the descriptive data for a given object.

In some embodiments, an interface translation file may include a vendor's <VendorOptions . . . > tag, with its "VendorPattern" and "ModelPattern" attributes. In one of these embodiments, this tag encloses the vendor's set of options, and the two attributes in this tag specify how the vendor's systems should be identified (from high-level SMI-S Product information). In other embodiments, an interface translation file may include a <XssaVendorString> string specifying a vendor string that the virtual storage manager service 210 will use within the ID strings for storage systems and storage nodes (e.g., not for storage volumes) from that vendor. In still other embodiments, other XML attributes (described below in detail) are optional. In one of these embodiments, an XML attribute is included in the vendor's XML data if that vendor implements features that enable the virtual storage manager service 210 to take advantage of the given vendor-specific features or optimizations.

In some embodiments, an interface translation file may include at least one XML tag. The following table—in which the storage delivery management service 210 is referred to as a virtual storage manager (VSM) module—describes some of the tags that may be included in one embodiment of the interface translation file:

| Option Tag Name | Description | Default Value |
| --- | --- | --- |
| VendorOptions | Identifies the Vendor Options section by system vendor and model name patterns, includes the VendorPattern and ModelPattern attributes. | For VendorPattern and ModelPattern attributes, no default. |
| vsmVendorString | Vendor substring of VSM ssid created for this vendor. | None. |
| vsmModelString | Model substring of VSM ssid created for this vendor. | "SYSTEM" |
| SysNameTrimString | System serial number prefix delimiter. | None, name string used in ssid. |
| VolumeRaidLevelProperty | SMI-S Storage Volume property that contains the Volume's Raid Level string. | None. Raid Level is determined through Pool or StorageSetting data. |
| VolumeIdProperty | SMI-S Storage Volume property used for the VSM node ID | Name |
| VolumeIdToken | Number of the token within the Volume ID property (when tokenized by space char) used for the VSM node ID. | None. Node ID contains the Volume ID property. |
| ViewFilterProperty | SMI-S SCSI ProtocolController (SPC) property used to filter which SPCs are to be kept when enumerated (for host-based Lun Masking operations). | None, all Views (SPCs) are kept. |
| ViewFilterValue | If ViewFilterProperty is specified, this is the value used to perform the test. Views whose filter property matches this value are kept. | None. |
| ViewFilterClassNameToken | Alternate method of filtering SPCs, based on vendor's SMI-S class name. For a view to be kept, its class name must contain this token. | None, all SPCs are kept. |
| PoolIdProperty | SMI-S Storage Pool property used for the VSM Pool's friendly name. | ElementName. |
| PoolFilterProperty | SMI-S StoragePool property used to filter which Pools are to be kept when enumerated (for Volume creation operations). | None, all non-primordial pools are kept. |
| PoolFilterValue | If PoolFilterProperty is specified, this is the value used to perform the test. Pools whose filter property matches this value are kept. | None. |

-continued

| Option Tag Name | Description | Default Value |
| --- | --- | --- |
| ExposePathElementNameParam | Optional (vendor-specific) parameter name for "friendly name" in Lun Masking (View/SPC creation). | None. |
| ViewNameSupported | Specifies whether vendor supports friendly names on View/SPC objects. | false |
| NodeNameSupported | Specifies whether vendor supports friendly names on Volume objects. | false |
| IPortNameSupported | Specifies whether vendor supports friendly names on initiator port objects. | false |
| MaxElementNameLength | If friendly names are supported on some objects, specified maximum number of characters allowed. | No limit. |

In one embodiment, a <VendorOptions> tag contains at least one token by which the VSM module recognizes and identifies a given Vendor/Model storage system, from data in that array's "Top Product" CIM instance, and encloses the Vendor Options section for the storage system type identified by attributes in this tag. In another embodiment, array providers implement the "Physical Product" profile, in which an instance of the CIM_Product class represents the product data for the system as a whole. In still another embodiment, the fields in this CIM_Product instance may include the two properties: a vendor name and a name of the storage system product (i.e., model). For example, the object path of an Acme Systems array model AZ1000 might look like the following: Acme_ArrayProduct.IdentifyingNumber="12345", Name="AZ1000", Vendor="Acme Systems Inc.", Version="1.2.3". This path may contain these properties: a serial number, a name or model of a product, a storage vendor name, a version of a product (e.g., a master firmware version). In still even another embodiment, the VSM module examines the data in this "Top Product" instance from the array's SMI-S provider and uses certain (minimal) regular expression matching to match the values in the Vendor and Name attributes from this instance to tokens within "VendorOptions" sections in the Vendor Options file. In still another embodiment, these regular expression patterns (which use only the asterisk character) may include: a direct match (for example, pattern "Acme" matches vendor "Acme" and only vendor "Acme"), a trailing wild card (for example, pattern "Acme*" matches "Acme" and "Acme Systems", but not "Northwest Acme"), a leading wild card (for example, pattern "*Acme" matches "Acme" and "Northwest Acme" but not "Acme Systems"), a leading and trailing wild card (for example, pattern "*Acme*" matches any vendor string in which the token "Acme" occurs anywhere, including "Acme", "Northwest Acme" and "Acme Systems"), and a wild card (for example, pattern "*" matches anything at all). The following are some examples of how a definition of an "Acme AZ1000" sample model might be set up in the VSM Vendor Options XML file:

```
<VendorOptions VendorPattern="Acme*" ModelPattern="AZ1000" >
    ... vendor/model-specific options, see below
</VendorOptions>
```

This example would match the vendor "Acme" per the examples above, and for the model would match the AZ1000. Other examples for the Model Pattern might include, by way of example, and without limitation, ModelPattern="AZ*" (matches any "AZ" model, including AZ, AZ1000, AZ500); ModelPattern="AZ1*" (matches any "AZ 1000 series" model, including AZ1000, AZ1500); ModelPattern="*" (matches any product/model). In some embodiments, at the end of the pattern matching search, the VSM module 210 will have identified a "VendorOptions" section of the vendor options XML file which matches the storage system in question and contains options and flags specific for that type of storage system.

In some embodiments, values identified by a vsmModelString tag are the substrings that the VSM module uses to construct the VSM "Storage System ID" ("ssid") for the specific storage system vendor/model, according to the specific VSM ssid format. For example, and in one of these embodiments, the Acme Systems model AZ1000, serial number 12345, might have an ssid of "ACME_AZ_12345". Or, as another example, if all Acme models behave exactly the same way, it might simply be "ACME_SYSTEM_12345". In other embodiments, while the vendor and model information used by VSM to pattern match/identify a specific type of array and construct the vendor and model portions of the ssid comes from the storage system's "Top Product" SMI-S instance, the serial number portion of the ssid does not need to come from the "IdentifyingNumber" property of this CIM_Product instance; rather it may come, for example, from the "Name" property of the actual instance of CIM_ComputerSystem representing the storage system itself. In still other embodiments, the translation of the vendor and model patterns into the VSM tokens within the VSM ssid is not necessarily literal or simply a shift to uppercase. For example, and in one of these embodiments, the VSM module might create ssid strings for storage systems from the "Consolidated Excelsior Incorporated" company to something like "CONEX_SYSTEM_123SerialNumber456". In still other embodiments, possible alternatives to a vender specifying a VSM SSID Token include, without limitation: a vendor supplying their own XML options file, excluding VSM vendor/model token strings, and submits this file to the VSM module 210; a vendor's XML options files are read individually by the VSM module 210, according to registry data; a VSM module 210 keeps (and updates, as vendors submit their files) a master XML file to coordinate the options for all vendors, and defines/sets certain internal options such as the VSM ssid tokens for the vendors. In further embodiments, if the <vsmModelString> tag is not included in the vendor's file, this value may assume a fixed default value, such as, for example, "SYSTEM".

In some embodiments, a tag (which may be referred to as a SysNameTrimString) provides a means for a serial number portion of the VSM ssid to exclude certain irrelevant prefix characters. For example, a system's CIM_ComputerSystem.Name property might be prefixed with additional characters delimited by, for example, an underscore character, such as: "AZSeries_12345". The options file can specify a "SysNameTrimString" tag, in this case an underscore, such as, by way of example: <SysNameTrimString>_</SysNameTrimString>; in this example, the VSM module 210 would remove the prefix before the underscore character, and use the remainder for the serial number portion of the generated ssid for that system.

In some embodiments, a tag (which may be referred to as a VolumeRaidLevelProperty) may indicate a value for a Raid Level for a given SMI-S Storage Volume. In one of these embodiments, the value may be determined by its association to that Volume's instance of StorageSetting. In another of these embodiments, the "Raid Level" in the terms of SMI-S data, may be the result of calculations involving numeric data including number of data copies, number of spindles that can fail, parity types, etc. Because, in some embodiments, the lookup of StorageSetting data for each and every Volume in the system is extremely expensive, and because Raid Level determination may be very client-unfriendly, and some vendors opt to simply populate a property on the Volume with a "raid level string", either using an existing StorageVolume property or by adding a vendor-specific one. In embodiments in which the vendor provides this data in a StorageVolume property, this VSM Vendor Option tag contains the name of that SMI-S Storage Volume property, which may result in the VSM avoiding the extra expense.

In some embodiments, a default SMI-S StorageVolume property used by VSM to generate the VSM "node ID" is "Name". If, in other embodiments, a different StorageVolume property contains better data for this purpose for some reason (such as "DeviceID", or perhaps "AcmeVolID"), a VSM Vendor Option tag (which may be referred to as VolumeIdProperty) may contain the name of that SMI-S StorageVolume property.

In some embodiments, a value for an SMI-S property used for a Volume ID includes a series of space-delimited substrings. In one of these embodiments, the VolumeIdToken can be specified as a numeric indicator (zero-based) as to which token within this data field is to be isolated and used in the VSM Node ID. For example, and in another of these embodiments, if a vendor specifies (using the VolumeIdProperty option) that the StorageVolume "DeviceID" property is to be used, and the SMI-S StorageVolume instances' DeviceID values are in the form of, for example, "Acme 1234567890", specifying the VolumeIdToken as "1" will result in only the second portion of those DeviceID strings will be used in the VSM Node ID strings. In still another of these embodiments, if no value is specified for such a tag, then by default the entire VolumeIdProperty value may be used.

In some embodiments, when Views (also known as the SMI-S "SCSIProtocolController", or "SPC", objects, and known within VSM as "Storage Assignments") for a storage system are enumerated, the default behavior is that SPC objects are propagated to the VSM module 210 as Storage Assignment objects. However, in other embodiments, storage systems instantiate different types of SPC objects for different purposes, not necessarily just for the host-based LUN Mapping/Masking of Storage Volumes. In one of these embodiments, the VSM module 210 allows the filtering of SPCs based on the value of certain SMI-S SPC properties by specifying the SPC property name to be examined. In another of these embodiments, any SPC object whose value for this property does match the filter value may be excluded from the enumerated list. In other embodiments, an option (which may be referred to as a ViewFilterValue) specifies a value for an SMI-S SPC property whose property name is specified by the ViewFilterProperty vendor option described above, which will allow a given SPC object, returned from a View enumeration operation, to be included in the list of Views returned to VSM to be converted into VSM Storage Assignment objects.

In some embodiments in which a vendor instantiates different types of View/SPC objects which the VSM module 210 would want to exclude from its list of Storage Assignment objects, these objects can be filtered using the ViewFilterProperty and ViewFilterValue options. However, in other embodiments, the SPC objects from some vendors do not include a property used for VSM filtering, and this filtering methodology cannot be used. In one of these embodiments, an alternate option can be employed, using a vendor option tag (which may be referred to as a ViewFilterClassNameToken vendor option). In another of these embodiments, this option looks at the vendor-specific SMI-S class name for each view object, looks for a certain substring within that class name, and keeps those View objects that contain a match. For example, if the option string is specified as "LunMasking", then an SPC object whose class name is "Acme_LunMaskingProtocolController" will match, while a class name of "Acme_BackendProtocolController" will not.

In one embodiment, a default SMI-S StoragePool property used by the VSM module 210 to generate a VSM friendly name (i.e., a display name for use by a VSM user interface) for the pool is "ElementName". In another embodiment, if a different StoragePool property contains different data for this purpose (such as "PoolID"), a VSM Vendor Option (which may be referred to as PoolIdProperty) contains the name of that SMI-S StoragePool property.

In some embodiments, when StoragePool objects for a storage system are enumerated, the default behavior is that all pool objects are propagated to the VSM module 210. However, in other embodiments, storage systems from some vendors instantiate different types of pool objects for different purposes, not necessarily just for the creation of Storage Volumes. In one of these embodiments, the VSM module 210 allows the filtering of Pools based on the value of certain SMI-S pool properties by specifying the pool property name to be examined via a PoolFitlerProperty vendor object tag. In another of these embodiments, a pool object whose value for a property does match the filter value may be excluded from the enumerated list. In other embodiments, a PoolFilterValue option specifies a value for the SMI-S pool property, whose property name is specified by the PoolFilterProperty vendor option, which will allow a given pool object, returned from a Pool enumeration operation, to be included in the list of Pools returned to a VSM to be converted into VSM pool objects.

In one embodiment, creation of a VSM "Storage Assignment" object, which joins access between Volumes/Nodes and host initiator ports through the "LUN Mapping and Masking" operations, uses the SMI-S configuration method "ExposePaths". In another embodiment, to specify the ElementName of the created SPC, some vendors have augmented their ExposePaths method signature to include an additional parameter, used to specify this friendly name input. In still another embodiment, since this enhancement is not part of the standard SMI-S specification (and therefore the name of this additional parameter is not standardized), any implementation of this additional capability is by definition vendor-specific. In yet another embodiment, if the vendor provides this additional input parameter on their ExposePaths method call, the name of that parameter can be specified using a vendor option, such as ExposePathsElementNameParam.

In some embodiments, for vendors that provide the ability to input friendly names on created objects (such as Volumes, Pools, Initiator Ports, Views, etc) but have limitations on the length of those names, the maximum name length can be specified using a vendor option such as MaxElementNameLength.

In some embodiments, vendors provide the ability to input friendly names on various types of created objects (such as Volumes, Pools, Initiator Ports, Views, etc). In one of these embodiments, vendor option flags enumerate which types of objects on which a given vendor supports user naming; for example, vendor option flags may include, without limitation, NodeNameSupported (friendly name supported on creating Storage Volumes); IPortNameSupported (friendly name supported on creating initiator ports); and ViewNameSupported (friendly name supported on creating SPC/Views).

The interface object responds to the request received from the second physical computing device with a translation of the received identification (510). In one embodiment, the translated identification is transmitted to the computing device 100, responsive to the received request. In another embodiment, the interface object 218 transmits a translated identifier to a broker computer 100a directly. In still another embodiment, the interface object 218 transmits a translated identifier indirectly, by providing it to the storage delivery management service 210, which may then transmit the translated identifier to the broker computer 100a. In some embodiments, the translated identifier is cached for later use.

In some embodiments, storage vendors with an SMI-S compliant storage provider can integrate their SMI-S provider with the interface object 218. In one of these embodiments, a method is provided allowing the provider to integrate a storage adapter 234 or storage system 232 with the interface object 218 and to provide an interface translation file. In another of these embodiments, the storage delivery management system 210 can interact with storage systems from multiple storage vendors. In still another of these embodiments, the SMI-S model provides vendors with means to represent descriptive data and management APIs for their storage systems 232 (and methods for configuration) in a standardized way. However, the SMI-S model, as it evolves, typically lags behind the capabilities of storage system technologies, particularly regarding those high-performance storage system features that are difficult to standardize in the model precisely because those features are intensely vendor-specific. In addition, in some conventional environments, SMI-S is a highly normalized model, requiring high volumes of individual query calls in order to fully assemble all the data describing instances of some classes (Storage Volumes and Physical Disk Drives for example), which can (and typically does) result in performance issues on the client side. In some embodiments, therefore, implementation of the methods and systems described herein improve performance.

Figure 5B:
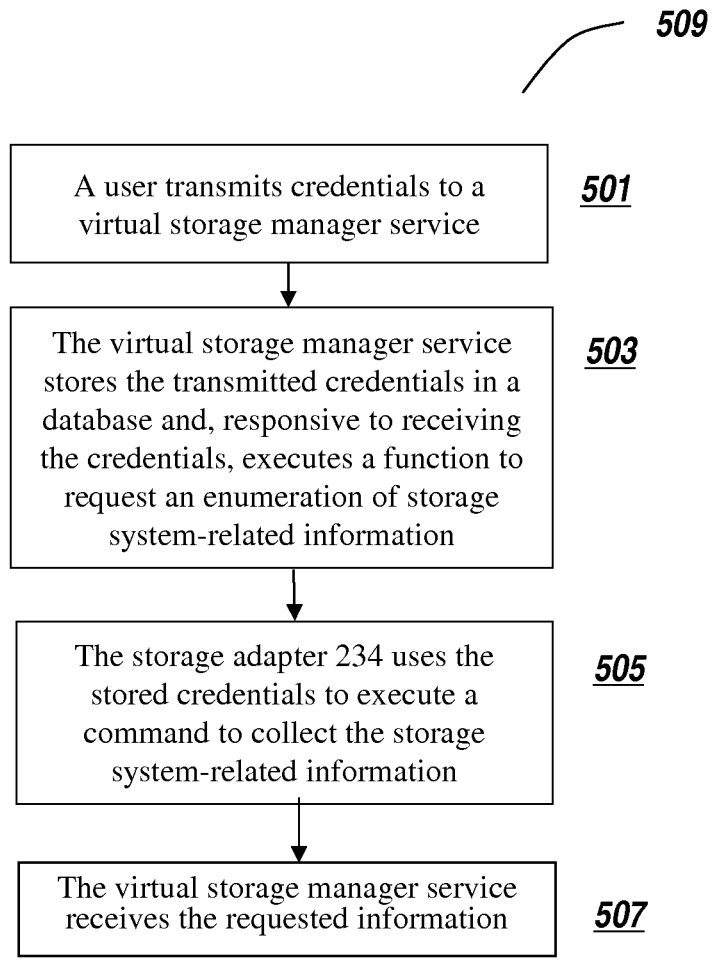
FIG. 5B is a flow diagram depicts an embodiment of a method in which the storage delivery management service requests data provided by a storage adapter.

Referring now to FIG. 5B, a flow diagram depicts an embodiment of a method 509 in which the storage delivery management service 210 (which may also be referred to as a virtual storage manager service) requests data provided by a storage adapter 234. In one embodiment, the interface object 218 receives a response to a request for data associated with a storage system 232, the response formatted in a vendor-specific format, and accesses the interface translation file to transform the data into a common format. In another embodiments, a user transmits credentials to a virtual storage manager service 210 (501); for example, the user may transmit the following to the virtual storage manager service 210: "vsm> storage-credential-add name=sys1 module=ACME ipaddress=10.10.10.10 username=admin password=pw". In still another embodiment, the virtual storage manager service 210 stores the transmitted credentials in a database and, responsive to receiving the credentials, executes a function to request an enumeration of storage system-related information (503); for example, the virtual storage manager service 210 may execute a function (such as, by way of example, a function referred to as "enumerateStorageSystems( )") on a storage adapter 234 registered with the module name "ACME" with the transmitted credentials. In still even another embodiment, the storage adapter 234 uses the stored credentials to execute a command (such as, by way of example, to call a vendor-specific management API) to collect the storage system-related information (505). In still another embodiment, and by way of example, one type of storage system-related information for a storage system object is its identifier. In another embodiment, the identifier is formed using a vendor identifier, a model identifier, and a serial number of the storage system. In this example, the vendor and model portion may be provided as ACME_A300_, for a (hypothetical) Acme Corporation A300 model of storage system. In another embodiment, a serial number example might be "ABCDEF12345, resulting in a storage system ID of ACME_A300_ABCDEF12345. In still another embodiment, non-alphanumeric characters are converted into hexadecimal characters. In one embodiment, the vendor supplies the XML code to describe a SCSI device ID processor for its storage adapter. In another embodiment, the XML code is utilized to process responses to requests for identifiers into identifiers expressed in a common, cross-vendor format. In yet another embodiment, the virtual storage manager service 210 receives the requested information (507).

Referring now to FIG. 5C, a block diagram depicts one embodiment of a portion of an interface translation file. In one embodiment, the interface translation file 512 provides a way of normalizing the identification of a storage device to a common format referred to as a storage node identifier which contains requested information. As depicted in FIG. 5B, and in one embodiment, a common formatting style is applied; for example, the format may delimit data by a double underscore or other separator (VENDOR_MODEL_STORAGE-SYSTEM-SERIAL-NUMBER_STORAGE-DEVICE-IDENTIFER).

The following is another example of one embodiment of an interface translation file with relatively few non-default options, other than supporting a wide variety of friendly names of limited length.

```
<?xml version="1.0" encoding="utf-8"?>
<SmisModuleVendorOptionList>
    <VendorOptions VendorPattern="Acme*" ModelPattern="AZ*" >
        <XssaVendorString>ACME</XssaVendorString>
        <XssaModelString>AZARRAY</XssaModelString>
        <ViewNameSupported>1</ViewNameSupported>
        <NodeNameSupported>1</NodeNameSupported>
        <IPortNameSupported>1</IPortNameSupported>
        <MaxElementNameLength>24</MaxElementNameLength>
    </VendorOptions>
</SmisModuleVendorOptionList>
```

The following is an example of one embodiment of an interface translation file including a plurality of configurable options:

```
<?xml version="1.0" encoding="utf-8"?>
<SmisModuleVendorOptionList>
    <VendorOptions VendorPattern="Consolidated Excelsior*"
```

```
            ModelPattern="*" >
        <XssaVendorString>CONEX</XssaVendorString>
        <SysNameTrimString>_</SysNameTrimString>
        <VolumeIdProperty>CEIWWN</VolumeIdProperty>
        <VolumeRaidLevelProperty>ErrorMethodology
        </VolumeRaidLevelProperty>
        <VolumeIdToken>1</VolumeIdToken>
        <ViewFilterProperty>CEIRole</ViewFilterProperty>
        <ViewFilterValue>LUNMASK</ViewFilterValue>
        <PoolFilterProperty>Usage</PoolFilterProperty>
        <PoolFilterValue>2</PoolFilterValue>
    <ExposePathElementNameParam>CEIElementName
    </ExposePathElementNameParam>
        <ViewNameSupported>1</ViewNameSupported>
        <NodeNameSupported>1</NodeNameSupported>
    </VendorOptions>
</SmisModuleVendorOptionList>
```

The following is an example of one embodiment of an interface translation file including a minimum in the configuration XML. In some embodiments, it would be assumed that this vendor would be depending on the SMI-S standard with no additional enhancements:

```
<?xml version="1.0" encoding="utf-8"?>
<SmisModuleVendorOptionList>
    <VendorOptions VendorPattern="Simple*" ModelPattern="*" >
        <XssaVendorString>SSI</XssaVendorString>
    </VendorOptions>
</SmisModuleVendorOptionList>
```

In some embodiments, SCSI device ID generation is accomplished by gathering=SCSI inquiry page information from all the LUNs discovered at the host and then processing it to create VSM Storage Node Identifiers for each node. The location of the information for form a Storage Node Identifier is specified and unique to each storage system so, in one of these embodiments, each vendor specifies how to create one. Rather than hard-coding this into the VSM service, in another of these embodiments, a vendor may specify this information in XML as a "SCSI Device ID Processor". The following are some examples of SCSI ID processors for various storage systems from various hardware vendors:

```
<?xml version="1.0" encoding="utf-8"?>
<ScsiDeviceIDProcessors xmlns:xsi="http://www.w3.org/2001/
XMLSchema-instance"
    xsi:noNamespaceSchemaLocation='scsi_device_id_config.xsd'>
    <ScsiDeviceIDProcessor>
        <InquiryMatch>
            <Vendor>DGC</Vendor>
        </InquiryMatch>
        <VendorID value="EMC">
        </VendorID>
        <ProductID value="CLARIION">
        </ProductID>
        <EnclosureID page="128" offset="4" length="14">
        </EnclosureID>
        <DeviceID page="131" offset="8" length="16" fmt="hex">
        </DeviceID>
    </ScsiDeviceIDProcessor>
    <ScsiDeviceIDProcessor>
        <InquiryMatch>
            <Vendor>HP</Vendor>
            <Product>HSV300</Product>
        </InquiryMatch>
        <VendorID value="HP">
        </VendorID>
        <ProductID value="EVA">
        </ProductID>
        <EnclosureID page="0" offset="154" length="16">
        </EnclosureID>
        <DeviceID page="131" offset="8" length="16" fmt="hex">
        </DeviceID>
    </ScsiDeviceIDProcessor>
    <ScsiDeviceIDProcessor>
        <InquiryMatch>
            <Vendor>HP</Vendor>
            <Product>MSA2212fc</Product>
        </InquiryMatch>
        <VendorID value="HP">
        </VendorID>
        <ProductID value="MSA">
        </ProductID>
        <EnclosureID page="131" offset="36" length="7">
        </EnclosureID>
        <DeviceID page="128" offset="4" length="32">
        </DeviceID>
    </ScsiDeviceIDProcessor>
    <ScsiDeviceIDProcessor>
        <InquiryMatch>
            <Vendor>HP</Vendor>
            <Product>MSA2212i</Product>
        </InquiryMatch>
        <VendorID value="HP">
        </VendorID>
        <ProductID value="MSA">
        </ProductID>
        <EnclosureID page="131" offset="36" length="7">
        </EnclosureID>
        <DeviceID page="128" offset="4" length="32">
        </DeviceID>
    </ScsiDeviceIDProcessor>
    <ScsiDeviceIDProcessor>
        <InquiryMatch>
            <Vendor>NETAPP</Vendor>
            <Product>LUN</Product>
        </InquiryMatch>
        <VendorID value="NETAPP">
        </VendorID>
        <ProductID value="LUN">
        </ProductID>
        <EnclosureID page="192" offset="20" length="4" fmt="hex">
        </EnclosureID>
        <DeviceID page="131" offset="21" length="12" fmt="hex">
        </DeviceID>
    </ScsiDeviceIDProcessor>
</ScsiDeviceIDProcessors>
```

In one embodiment, the InquiryMatch information is used to determine if a given LUN with its VENDOR and PRODUCT strings in the STD INQUIRY page are a match with this SCSI ID processor. If so, the values under VendorID and Product ID are used to form the first half of the Storage Node ID. In another embodiment, the information in the Enclosure ID tag is used to extract information from the indicated SCSI VDP page to form the Enclosure ID portion of the Storage Node ID. In still another embodiment, the device ID is extracted. In yet another embodiment, the final storage node id may take the form: VENDORID_PRODUCTID_ENCLOSUREID_DEVICEID. In some embodiments, this will match the Storage Node ID layout generated by the storage system interface object 234 (see enumerateStorageNodes, getStorageNodeInfo) or specified in the interface translation XML file for SMI-S based integrations.

Figure 5D:
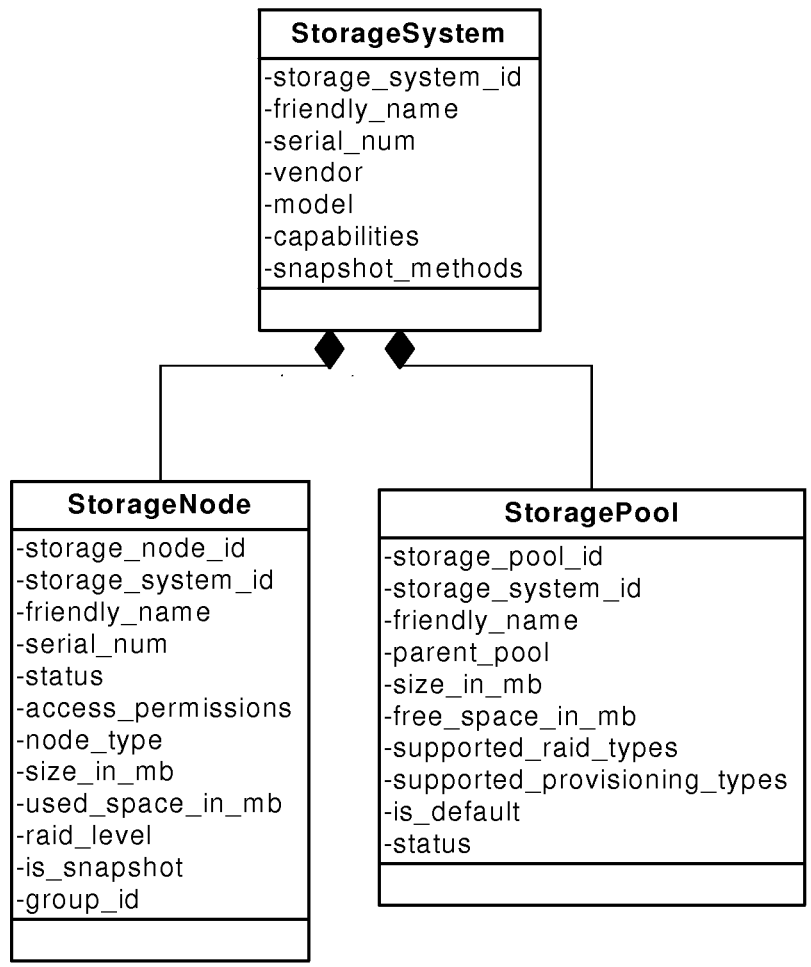
FIG. 5D is a block diagram depicting one embodiment of a data model identifying data associated with a storage system.

Referring now to FIG. 5D, a block diagram depicts one embodiment of a data model identifying data associated with a storage system and available for retrieval by a storage delivery management service 210. In one embodiment, data associated with a storage system includes, without limitation, an identifier, an alias, a serial number, a vendor name or identifier, a model identifier, an identification of at least one capability, and an identification of available functionality. In another embodiment, data associated with the storage system includes data associated with a storage node within the storage system including, without limitation, a node identifier, a system identifier, an alias, a serial number, a status, an access control list, a type of node, a size of the node, an amount of space used in a node, an amount of space available in a node, information associated with redundancy features, a group identifier, and an identifier of functionality available. In still another embodiment, data associated with the storage system includes data associated with a storage pool including, without limitation, a pool identifier, a system identifier, an alias, a parent pool identifier, a size of the pool, an amount of space used in a pool, an amount of space available in a pool, information associated with redundancy features, information associated with types of provisioning functionality availability, default configuration data, and status data.

Figure 5E:
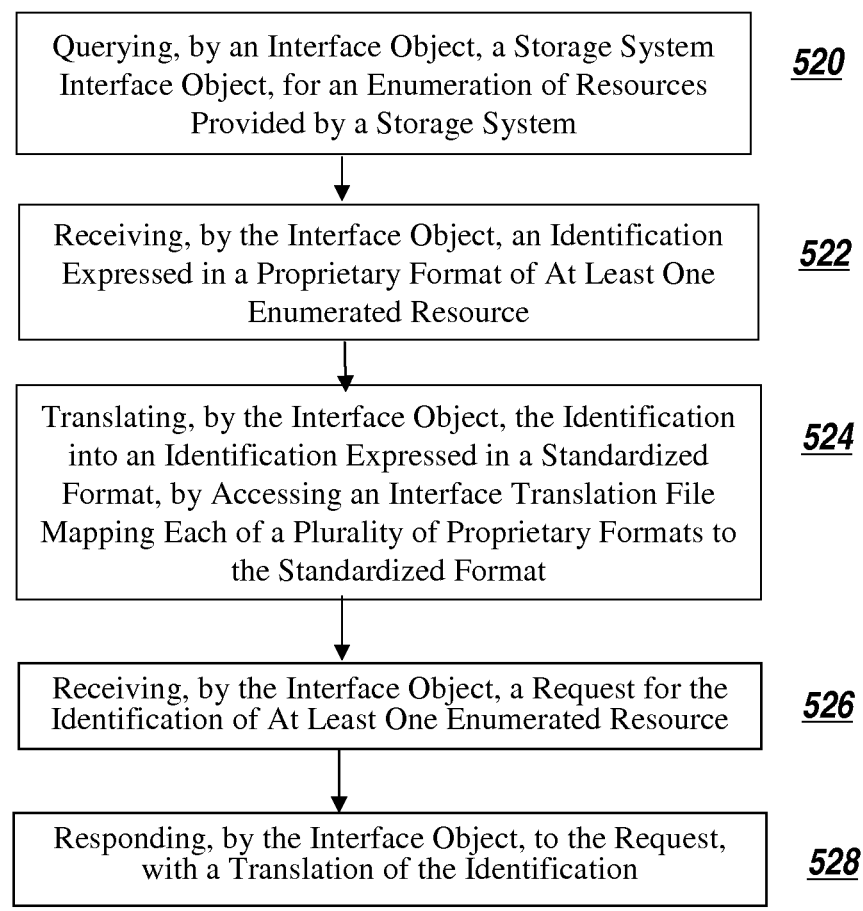
FIG. 5E is a flow diagram depicting another embodiment of a method for retrieving data from a storage system in a cloud computing environment.

Referring now to FIG. 5E, a flow diagram depicts another embodiment of another method for providing translations of data retrieved from a storage system in a cloud computing environment. In brief overview, the method 515 includes querying, by an interface object, a storage system interface object, for an enumeration of resources provided by a storage system (520). The method includes receiving, by the interface object, an identification expressed in a proprietary format of at least one enumerated resource (522). The method includes accessing, by the interface object, an interface translation file to translate the identification into an identification expressed in a standardized format, the interface translation file mapping each of a plurality of proprietary formats to the standardized format (524). The method includes receiving, by the interface object, a request for the identification of at least one enumerated resource (526). The method includes responding, by the interface object, to the request with a translation of the identification (528).

Referring now to FIG. 5E, and in greater detail, the interface object 218 queries a storage system interface object 234 for an enumeration of resources provided by a storage system (520). In some embodiments, the interface object 218 undergoes a discovery process to develop an enumeration of resources that are available in advance of a request by the storage delivery management service 210. In other embodiments, the interface object 218 undergoes the discover process responsive to a request by the storage delivery management service 210.

In some embodiment, storage discovery methods allow a storage delivery management service 210 to discover information about the storage systems, pools, volumes, target ports and other information which it needs to carry out operations with storage systems 232. In one of these embodiments, a method, which may be referred to as enumerateStorageSystems, allows the storage delivery management service 210 to identify which storage systems can be managed given the available login credentials supplied by the administrator for a storage adapter 234. In this embodiment, when at least one storage system 232 has been discovered, users can execute operations utilizing the storage system 232. In this embodiment, when the storage systems 232 have been discovered, the storage delivery management service 210 proceeds to discover additional detail about at least one storage system 232 via the other enumeration calls (which may be referred to, for example, and without limitation, as enumerateStoragePools calls or enumerateStorageNodes calls).

In another of these embodiments, a storage discovery method, which may be referred to as getStorageSystemInfo, requests information on a specific system 232 rather than for all systems available given a set of management credentials. In still another of these embodiments, a given management credential (IP address, username, password) maps one-to-one to a single storage system. In such embodiments, the two APIs may be substantially similar, allowing a user to implement the method with a call such as, by way of example, "return enumerateStorageSystems(cred);". In other embodiments, a given credential provides access to a management appliance through which multiple storage systems 232 can be managed. In either case, this method returns storage system info for a specific storage system 232 identified by the storageSystemId input argument.

In some embodiments, a storage node may also be referred to (e.g., in the SMI-S model) as a Storage Volume or as a Virtual Disk or a LUN. In other embodiments, the term Storage Node is used and may also refer to additional Storage Node types (such as NAS storage). In still other embodiments, the term storage node and storage volume are used interchangeably. In yet other embodiments, a discovery method that may be referred to as enumerateStorageNodes returns a list of exposable storage nodes in the storage system 232; this may include storage nodes that are already assigned to hosts. In further embodiments, a discovery method that may be referred to as getStorageNodeInfo provides information associated with a particular storage node.

In some embodiments, a storage pool is a pool of storage from which a storage node (which may also be referred to as Storage Volume) can be created. Common vendor names for a storage pool include names like RAID Group, Volume Group, and Disk Group. In one of these embodiments, a logical entity from which one can create Storage Volumes is a Storage Pool. In another of these embodiments, storage systems have Storage Pools that have a RAID type associated with them; others have a set of RAID types that the administrator can select when the storage node is being created. In still another of these embodiments, a method that may be referred to, by way of example, as enumerateStoragePools provides an enumeration of available storage pools. In yet another of these embodiments that may be referred to, by way of example, as getStoragePoolInfo provides information associated with a particular storage pool.

In some embodiments, a storage discovery method, which may be referred to as enumerateInitiatorPorts, provides a list of initiators that are logged into the storage system 232. In other embodiments, a storage discovery method, which may be referred to as enumerateTargetPorts, returns a list of front-end ports (both FC and iSCSI) in the storage system 232; front-end ports may be ports that are used to expose storage to the hosts.

In some embodiments, the term 'storage assignment' refers to LUN masking & mapping. In one of these embodiments, there are a plurality of methods that a vendor may implement to enable support for LUN masking including, without limitation, methods to enumerate storage assignments, retrieve storage assignment information for a particular system, assign access to a storage node to one or more host initiator ports, or unassign access to a storage node to one or more host initiator ports (these may be referred to, by way of example, and without limitation as enumerateStorageAssignments, getStorageAssignmentInfo, assignStorage and unassignStorage, respectively). In another of these embodiments, the list of host initiator ports passed to the assignStorage call is a set of host initiator ports that reside within the same host. In still another of these embodiments, LUN masking may result in providing access to one or more Storage Nodes, via one or more Storage System Target Ports (front-end ports), to one or more Host Initiator (HBA) ports. In other embodiments, methods are provided for generating snapshots of virtual storage resources. In still other embodiments, methods are provided for cloning existing storage resources.

The interface object 218 receives an identification expressed in a proprietary format of at least one enumerated resource (522). As described above in connection with FIG. 5A, the response from the storage system interface object 234 may be in a vendor-specific format, in spite of a vendor complying with a standard or specification.

The interface object 218 accesses an interface translation file to translate the identification into an identification expressed in a standardized format, the interface translation file mapping each of a plurality of proprietary formats to the standardized format (524). As described above, and in Appendix A, the interface object 218 uses the interface translation file to identify data within the vendor-specific response and to generate an identification of the data in a universal, standardized format.

The interface object 218 receives a request for the identification of at least one enumerated resource (526). In one embodiment, the interface object 218 receives the request from the storage system communication component 214. In another embodiment, the interface object 218 receives the request from the storage delivery management service 210.

The interface object 218 responds to the request with the translated identification (528). In one embodiment, the interface object 218 transmits the translated identification to the requesting entity. In another embodiment, the interface object 218 retrieves the translated identification from a cache, database, or other storage element and transmits the retrieved translated identification to the requestor.

In some embodiments, implementation of the methods and systems described herein provide a unified management interface for configuring storage area networks to provide virtual storage resources for access by computing devices on other networks. In one of these embodiments, a system in a cloud computing environment may include multiple virtual computing environments spanning the globe. In another of these embodiments, by using the methods and systems described herein, a customer of a storage system provider is insulated from having to address the administrative tasks that accompany management of a virtual computing environment. With administrative tasks processed by a centralized management service, in these embodiments, management becomes virtualized, alleviating administrative burdens of the customers. These embodiments allow users of cloud computing environments to make requests for provisioning without having to attend to the administrative details of carrying out the requests themselves. By insulating customers from administrative tasks of managing a virtual computing environment, such a centralized, automated, virtual storage management service allows customers to focus on provisioning and managing the services they provide to their own users and customers, such as access to applications, virtual machines, and other resources.

The following illustrative examples show how the methods and systems discussed above may be used for automated provisioning, by a storage delivery management service, of virtual machines in a cloud computing environment. These examples are meant to illustrate and not to limit the disclosure.

Example 1

In one embodiment, the storage delivery management system 210 receives, via a web services interface, a request from a broker computer 100*a* for provisioning of a virtual storage resource 240, such as a virtual disk, on behalf of a host computing device 100*b*. In another embodiment, the host computing device communication component 212 receives the request. In still another embodiment, the request for provisioning the virtual storage resource 240 occurs as part of a process for provisioning a virtual machine 106*b* for execution on the host computing device 100*b*. In some embodiments, the virtual storage resource 240 is a virtual disk. However, it should be understood that the virtual storage resource 240 may be any virtualized resource, including any of those described above in connection with FIG. 1A.

In one embodiment, the storage delivery management service 210 transmits the request for provisioning of the virtual storage resource 240 to the storage system communication component 214. In another embodiment, the storage system communication component 214 communicates with a storage system adapter 234 to identify an available storage system 232 providing resources required to provision the requested virtual storage resource. In still another embodiment, the storage system communication component 214 transmits an identification of the identified storage system 232 to the storage delivery management service 210. In still even another embodiment, the storage system communication component 214 transmits an identification of the provisioned virtual storage resource 240 to the storage delivery management service 210. In yet another embodiment, the storage delivery management service 210 stores the identification of the storage system 232 in a database accessible to the broker computer 100*a*. In some embodiments, the storage system communication component 214 and the storage system adapter 234 communicate according to WBEM or other storage protocol. In other embodiments, the storage system communication component 214 requests CIM OM data or SMI-S data associated with the storage system 232 from the storage system adapter 234.

In one embodiment, the broker computer 100*a* receives the identification of the storage system 232 from the host computing device communication component 212. In another embodiment, the broker computer 100*a* retrieves the identification of the storage system 232 from a database of available storage systems. In still another embodiment, the broker computer 100*a* confirms that the storage system 232 is able to provide the requested virtual storage resource. In yet another embodiment, the broker computer 100*a* transmits, to a host computing device 100*b*, an identification of the storage system 232.

In one embodiment, the host computing device 100*b* transmits, to the host computing device communication component 212, a request for access to the virtual storage resource 240. In another embodiment, the host computing device 100*b* transmits, to the host computing device communication component 212, a request for an identification of the virtual storage resource 240. In still another embodiment, the host computing device communication component 212 transmits, to the host computing device 100*b*, an identification of the virtual storage resource 240.

In one embodiment, the host computing device communication component 212 transmits, to the host computing device 100*b*, an instruction to request, from the switch fabric 220 an enumeration of storage systems 232 with which the host computing device 100*b* is authorized to communicate. In another embodiment, the host computing device 100*b* receives, from a component in the switch fabric 220, an enumeration of software systems 232 with which the host computing device 100*b* is authorized to communicate. In still another embodiment, the host computing device 100*b* communicates with the storage system 232 across the switch fabric 220 to access the virtual storage resource 240.

In one embodiment, the host computing device communication component 212 receives, from the broker computer 100a, a request to migrate the virtual machine 106b from the host computing device 100b to a host computing device 100c. In another embodiment, the host computing device communication component 212 receives, from the broker computer 100a, a notification that a migration of the virtual machine 106b from the host computing device 100b to a host computing device 100c is in progress. In still another embodiment, the host computing device 100b transmits, to at least one of the broker computer 100a and the storage delivery management service 210, a request for migration of the virtual machine 106b to a second host computing device 100b. In still even another embodiment, the host computing device communication component 212 receives the request to migrate the virtual machine from a control operating system 105a executing on at least one of the broker computer 100a, the host computing device 100b, and a third host computing device 100d, which provides management functionality for a network 38 on which the host computing devices reside. In yet another embodiment, the host computing device communication component 212 receives a request to allocate, to a second physical computing device 100c, access to the virtual storage resource 240. In some embodiments, the storage delivery management service 210 receives the request because without access to the virtual storage resource 240, the migration of the virtual machine 106b to the host computing device 100c is likely to terminate unexpectedly. In other embodiments, upon receiving the request to or indication of migration, the storage delivery management service 210 communicates with the components in the storage area network 230 and the switch fabric 220 required to change the access settings for the virtual storage resource 240 so that the second computing device may access the virtual storage resource 240.

In one embodiment, by executing the host computing device communication component 212 and the storage system communication component 214, the storage delivery management service 210 seamlessly transitions access to a virtual storage resource from a first computing device to a second computing device. In another embodiment, by executing the fabric management component 216, the storage delivery management service 210 configures the switch fabric 220 to allow access to the virtual storage resource 240 by a physical computing device executing a virtual machine requiring access to the virtual storage resource. In still another embodiment, by providing functionality for automatically updating access control lists and transmitting the identifiers needed to allow the storage system 232 and the second computing device 100 to establish a communication session and provide the virtual machine with access to the virtual resource, the storage delivery management service 210 provides automated, integrated support for provisioning and re-provisioning virtual resources in cloud computing environments.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for dynamically switching between communications protocols used in communicating with each of a plurality of physical computing devices, it will now become apparent to one of skill in the art that other embodiments incorporating the concepts of the invention may be used. Therefore, the disclosure should not be limited to certain embodiments, but rather should be limited only by the spirit and scope of the following claims.

What is claimed is:

1. A method for dynamically switching between communications protocols used in communicating with each of a plurality of physical computing devices, the method comprising:
    requesting, by a storage delivery management service executing on a first server, an enumeration of communication protocols supported by a storage system executing on a second server in a storage area network;
    requesting, by the storage delivery management service, an enumeration of communication protocols supported by a first physical computing device executing a virtual machine;
    identifying, by the storage delivery management service, a first communication protocol supported by both the storage system and the first physical computing device;
    configuring, by the storage delivery management service, the storage system to communicate according to the first communications protocol with the first physical computing device, the storage system providing, to the virtual machine, access to a virtual storage resource;
    receiving, by the storage delivery management service, a request to migrate the virtual machine from the first physical computing device to a second physical computing device; and
    configuring, by the storage delivery management service, the storage system to communicate with the second physical computing device according to a second communications protocol different from the first communications protocol.

2. The method of claim 1, further comprising transmitting, by the storage delivery management service, an identification to the storage area network of at least one network port on the second physical computing device.

3. The method of claim 1, further comprising:
    determining that the storage system is capable of providing access to the virtual storage resource to the second physical computing device; and causing the virtual machine to migrate to the second physical computing device based on the determination.

4. The method of claim 1, wherein the virtual storage resource is a virtual disk upon which the virtual machine executes.

5. The method of claim 1, wherein at least one of the first and second communications protocols includes at least one of the Fibre Channel Protocol, the Fibre Channel over IP Protocol, and the iSCSI Protocol.

6. The method of claim 1, further comprising transmitting, by the storage delivery management service, to the second physical computing device, a confirmation of support by the storage system of a default communications protocol used by the second physical computing device.

7. The method of claim 1, further comprising transmitting, by the storage deliver management service, an indication to the storage system that the first physical computing device is no longer authorized to access the virtual storage resource.

8. The method of claim 1, further comprising configuring, by the storage delivery management service, an access control list to include an identification of at least one network port of the second physical computing device.

9. The method of claim 8, further comprising transmitting, by the storage delivery management service, an instruction to the storage system to remove at least one network port of the first physical computing device from the access control list.

10. A system for dynamically switching between communications protocols used in communicating with each of a plurality of physical computing devices comprising:
a storage delivery management service executing a host computing device communication component and a storage system communication component, wherein the storage delivery management service comprises a hardware server that:
(i) receives a request for migration of the virtual machine from a first physical computing device to a second physical computing device,
(ii) requests an enumeration of communication protocols supported by a storage system executing on a server in a storage area network,
(iii) requests an enumeration of communication protocols supported by the first physical computing device executing the virtual machine,
(iv) identifies a first communication protocol supported by both the storage system and the first physical computing device,
(v) configures the storage system to communicate according to the first communications protocol with the first physical computing device, the storage system providing to the virtual machine access to a virtual storage resource,
(vi) receives a request, from the host computing device communication component, to migrate the virtual machine to the second physical computing device, and
(vii) configures the storage system to communicate according to a second communications protocol, different from the first communications protocol, with the second physical computing device.

11. The system of claim 10, wherein the storage delivery management service transmits to the storage area network an identification of at least one network port on the second physical computing device.

12. The system of claim 10, wherein the storage delivery management service:
determines that the storage system is capable of providing access to the virtual storage resource to the second physical computing device; and
causes the virtual machine to migrate to the second physical computing device based on the determination.

13. The system of claim 10, wherein the virtual storage resource comprises a virtual disk upon which the virtual machine executes.

14. The system of claim 10, wherein the storage system communication component further configures the storage system to communicate with the second physical computing device according to the Fibre Channel Protocol.

15. The system of claim 10, wherein the storage system communication component further configures the storage system to communicate with the second physical computing device according to the iSCSI Protocol.

16. The system of claim 10, wherein the storage system communication component transmits to the second physical computing device a confirmation of support by the storage system of a default communications protocol used by the second physical computing device.

17. The system of claim 10, wherein the storage system communication component transmits an indication to the storage system that the first physical computing device is no longer authorized to access the virtual storage resource.

18. The system of claim 10, wherein the storage system communication component further configures an access control list to include an identification of at least one network port of the second physical computing device.

19. The method of claim 1, comprising:
determining, by the storage delivery management service, that the second physical computing device supports the second communications protocol; and
transmitting, by the storage delivery management service, to the second physical computing device, an identification of the storage system providing access to the virtual storage resource for the virtual machine.

20. The system of claim 10, wherein the storage delivery management service transmits, to the second physical computing device, an identification of the storage system providing access to the virtual storage resource for the virtual machine.

* * * * *